(12) United States Patent
Takeuchi

(10) Patent No.: US 10,496,006 B2
(45) Date of Patent: Dec. 3, 2019

(54) IMAGE FORMING APPARATUS HAVING VARIABLE EXPOSURE START TIMING DEPENDING ON IMAGE INFORMATION

(71) Applicant: CANON KABUSHIKI KAISHA, Tokyo (JP)

(72) Inventor: Yasushi Takeuchi, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/196,624

(22) Filed: Nov. 20, 2018

(65) Prior Publication Data

US 2019/0163089 A1 May 30, 2019

(30) Foreign Application Priority Data

Nov. 24, 2017 (JP) .................................. 2017-225985

(51) Int. Cl.
*G03G 15/04* (2006.01)
*G03G 15/043* (2006.01)
*H04N 1/028* (2006.01)
*H04N 1/053* (2006.01)
*G06K 15/12* (2006.01)

(52) U.S. Cl.
CPC ....... *G03G 15/043* (2013.01); *G06K 15/1219* (2013.01); *H04N 1/02815* (2013.01); *H04N 1/053* (2013.01)

(58) Field of Classification Search
CPC ............. G03G 15/043; G03G 15/5008; G03G 21/145; G03G 2215/0008; G06K 15/1219; H04N 1/12; H04N 1/053

USPC .................................... 399/51; 347/235, 250
See application file for complete search history.

(56) References Cited

U.S. PATENT DOCUMENTS 8,471,886 B2 * 6/2013 Shoji ....................... B41J 2/473
347/236
8,472,821 B2 * 6/2013 Shirakata ........... G03G 15/0131
399/301

FOREIGN PATENT DOCUMENTS

JP 2000-003080 1/2000
JP 2011137915 A * 7/2011

* cited by examiner

*Primary Examiner* — Robert B Beatty
(74) *Attorney, Agent, or Firm* — Venable LLP

(57) ABSTRACT

An image forming apparatus includes a photosensitive member; a charging device, a developing device, a transfer device, and a controller. The controller is capable of executing an operation in a first mode in which an image forming operation is controlled so that an exposure start enable timing is set during movement of the photosensitive member through one full circumference from first passing, through an exposure position, of a region of the photosensitive member which has passed through a charging position, and executing an operation in a second mode in which an image forming operation is controlled so that the exposure start enable timing is set after the movement of the photosensitive member. On the basis of image information of the first sheet of an image forming job, the controller selects an executing mode from a plurality of modes including at least the first mode and the second mode.

11 Claims, 14 Drawing Sheets

|  |  |  |  |  |  |
|---|---|---|---|---|---|
| X0Y0 | X1Y0 | X2Y0 | X.3Y0 | ••• | X.NY0 |
| X0Y1 |  |  |  |  |  |
| X0Y2 | DENSITY A | DENSITY B |  |  |  |
| X0Y3 | DENSITY A | DENSITY B |  |  |  |
| ⋮ |  |  |  |  |  |
| X0YN |  |  |  |  | XNYN |

Fig. 11

IMAGE FORMING APPARATUS HAVING VARIABLE EXPOSURE START TIMING DEPENDING ON IMAGE INFORMATION

FIELD OF THE INVENTION AND RELATED ART

The present invention relates to an image forming apparatus, such as a copying machine, a printer, a facsimile machine, a printing device or a multi-function machine having a plurality of functions of these machines, of an electrophotographic type.

In recent years, in the image forming apparatus of the electrophotographic type, importance is placed on productivity, so that particularly shortening of a first copy output time (FCOT) has been required. In order to shorten the FCOT, shortening of a time of an operation sequence during image formation including drive of a photosensitive drum, application of biases (charging bias, developing bias, transfer bias and the like) by respective high-voltage sources, formation of an electrostatic latent image by an exposure means, and the like is important.

Therefore, as disclosed in Japanese Laid-Open Patent Application (JP-A) 2000-003080, there is a technique such that application of charging biases (charging AC bias and charging DC bias) is started simultaneously with a start of drive of a photosensitive drum and thus formation of a charge potential of the photosensitive drum is made early. However, in JP-A 2000-003080, a sequence such that the charging bias is continuously applied from a start of a potential on a surface of the photosensitive drum over a time of movement of the photosensitive drum through one full circumference and thus the potential of the surface of the photosensitive drum in an entire area is made uniform and then application of biases other than the charging bias is started is performed.

Therefore, in order to further shorten the FCOT, it would be considered that formation of an electrostatic latent image of an exposure means and application of other biases such as a developing bias and a transfer bias are started from a position where rising of a surface potential of the photosensitive drum by a charging means is completed.

Incidentally, large and small (high and low) values of the potential refer to those in comparison in terms of an absolute voltage. In the case where a position and a region on the photosensitive drum with respect to a rotational direction of the photosensitive drum are mentioned, those will be omitted from explicit description in some instances.

However, in the case where the formation of the electrostatic latent image is started before the photosensitive drum turns one full circumference from completion of rising of both of the charging bias and the transfer bias, there is a possibility that a density difference generates on an output image. Incidentally, the completion of rising of the charging bias specifically means that a surface potential of the photosensitive drum (or a potential of the charging means) immediately after an associated position (portion) of the photosensitive drum passes through a charging position is stabilized within a predetermined range relative to a target voltage. Further, the completion of rising of the transfer bias specifically means that a potential of a transfer means (or a surface potential of the photosensitive drum immediately after the associated position of the photosensitive drum passes through a transfer position) is stabilized within a predetermined range relative to a target voltage.

Herein, a mechanism of generation of the density difference on the output image will be described using an image forming apparatus having the following constitution as an example. That is, the surface of the photosensitive drum is electrically charged to a negative polarity by a charging roller to which the charging bias is applied, and then the electrostatic latent image is formed by subjecting the charged surface of the photosensitive drum to imagewise exposure by an exposure device. Then, a toner image is formed by supplying negative(-polarity) non-magnetic toner from a developing device to this electrostatic latent image, and this toner image is transferred from the photosensitive drum onto a transfer material by a transfer roller to which the transfer bias is applied. The charging bias is a negative DC bias or a bias in the form of the negative DC bias superposed (biased) with a charging AC bias, and the transfer bias is a positive transfer DC bias.

In such a constitution, when a relationship between the charging bias and the transfer bias is noted, a manner of an increase in charging bias and a manner of an increase in transfer bias are different from each other in general. This is because materials of the respective members (charging roller, transfer roller and the like) are different or a use status (whether a lifetime period is an initial stage or the last stage, or the like) is different even when the same material is used, and therefore, a manner of an increase in potential of an actual member under application of a bias by a high-voltage source changes. Accordingly, control is generally carried out so that rising of the charging bias is completed slightly earlier than rising of the transfer bias. Further, even in a constitution in which an electrically discharging means for electrically discharging a residual potential of the surface of the photosensitive drum after the photosensitive drum surface passes through a transfer position is provided, the discharging means is designed on the precondition that the residual potential of the surface of the photosensitive drum after both of the rising of the charging bias and the rising of the transfer bias are completed is removed (electrically discharged).

In such a constitution, before the photosensitive drum moves through one full circumference, the charging bias of which rising is completed is applied, but the transfer bias of which rising is completed is not applied to the surface of the photosensitive drum. The surface of the photosensitive drum cannot completely remove the residual potential by the electrically discharging means, so that the surface of the photosensitive drum reaches the charging position again while holding a potential higher than a normal potential. At a portion where the residual potential cannot be removed, a potential formed at the charging position by movement of the photosensitive drum through two full circumferences is higher than potentials (normal potentials) at a preceding portion thereof and a subsequent portion thereof. Incidentally, the normal potential specifically refers to a potential of a portion where both of the charging position of which rising is completed and the transfer bias of which rising is completed are applied and the residual potential is sufficiently removed after the photosensitive drum surface passes through a discharging portion. Then, the high-potential portion reaches an exposure position, and when exposure is carried out, an output image causes a density difference due to a potential difference between a normal potential portion and a portion where the residual potential is not removed.

Incidentally, at the time of movement of the photosensitive drum through subsequent full circumferences, the charging bias of which rising is completed and the transfer bias of which rising is completed are applied, so that an abnormal residual potential such that the abnormal residual potential cannot be removed by the discharging means does not generate, and therefore, the density difference of the output image also does not generate.

Further, this phenomenon generates in a system in which the electrostatic latent image is formed at a position where the surface potential of the photosensitive drum is increased by the influence of the residual potential as described above, and therefore, such a phenomenon also generates in some instances even in a constitution as disclosed in JP-A 2000-003080 in which the exposure is started immediately after a charge potential is formed on the photosensitive drum.

SUMMARY OF THE INVENTION

A principal object of the present invention is to provide an image forming apparatus capable of improving productivity of an image while suppressing generation of a density difference on an output image.

According to an aspect of the present invention, there is provided an image forming apparatus comprising: a rotatable photosensitive member; a charging device configured to electrically charge the photosensitive member at a charging position under application of a voltage thereto; an exposure device configured to expose the photosensitive member charged by the charging device, to light at an exposure position thereby to form an electrostatic image on the photosensitive member; a developing device configured to develop the electrostatic latent image into a toner image by supplying toner to a region of the photosensitive member exposed by the exposure device; a transfer device configured to transfer the toner image from the photosensitive member onto a toner image receiving member at a transfer position under application of a voltage thereto; and a controller capable of executing, an operation in a first mode in which an image forming operation is controlled so that an exposure start enable timing of the exposure device for a first sheet in an image forming job is set during movement of the photosensitive member through one full circumference from first passing, through the exposure position, of a region of the photosensitive member which has passed through the charging position when a DC voltage applied to the charging device with a start of image formation reaches a predetermined target voltage, and an operation in a second mode in which an image forming operation is controlled so that the exposure start enable timing is set after movement of the photosensitive member through one full circumference after first passing, through the exposure position, of the region of the photosensitive member which has passed through the charging position when the DC voltage applied to the charging device with the start of image formation reaches the predetermined target voltage, wherein on the basis of image information of the first sheet of the image forming job, the controller selects an executing mode from a plurality of modes including at least the first mode and the second mode.

Further features of the present invention will become apparent from the following description of exemplary embodiments with reference to the attached drawings.

Figure 7:
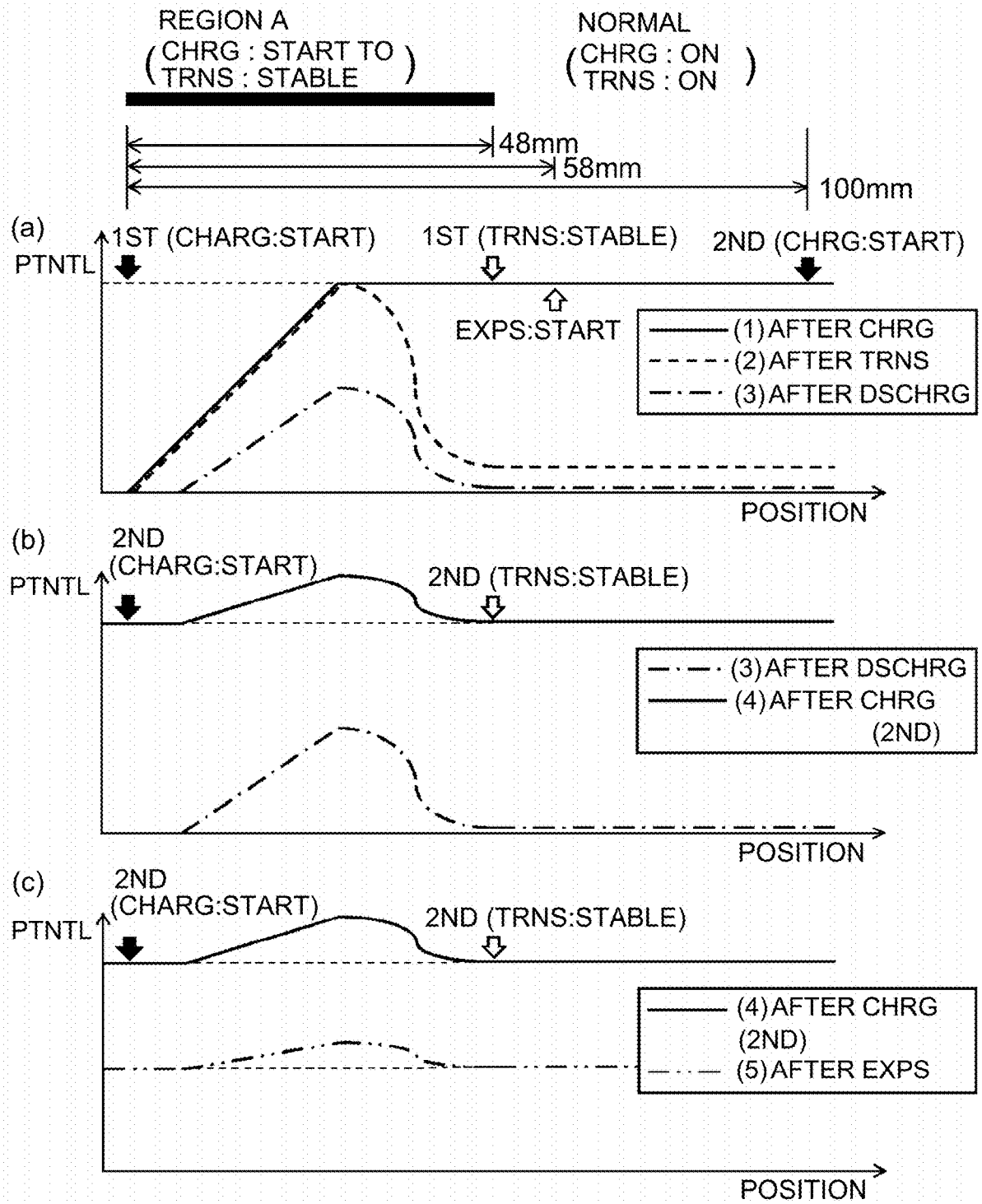

Parts (a) to (c) of FIG. 7 are charts each showing a progression of a surface potential of a photosensitive drum during the FCOT mode.

Figure 8:
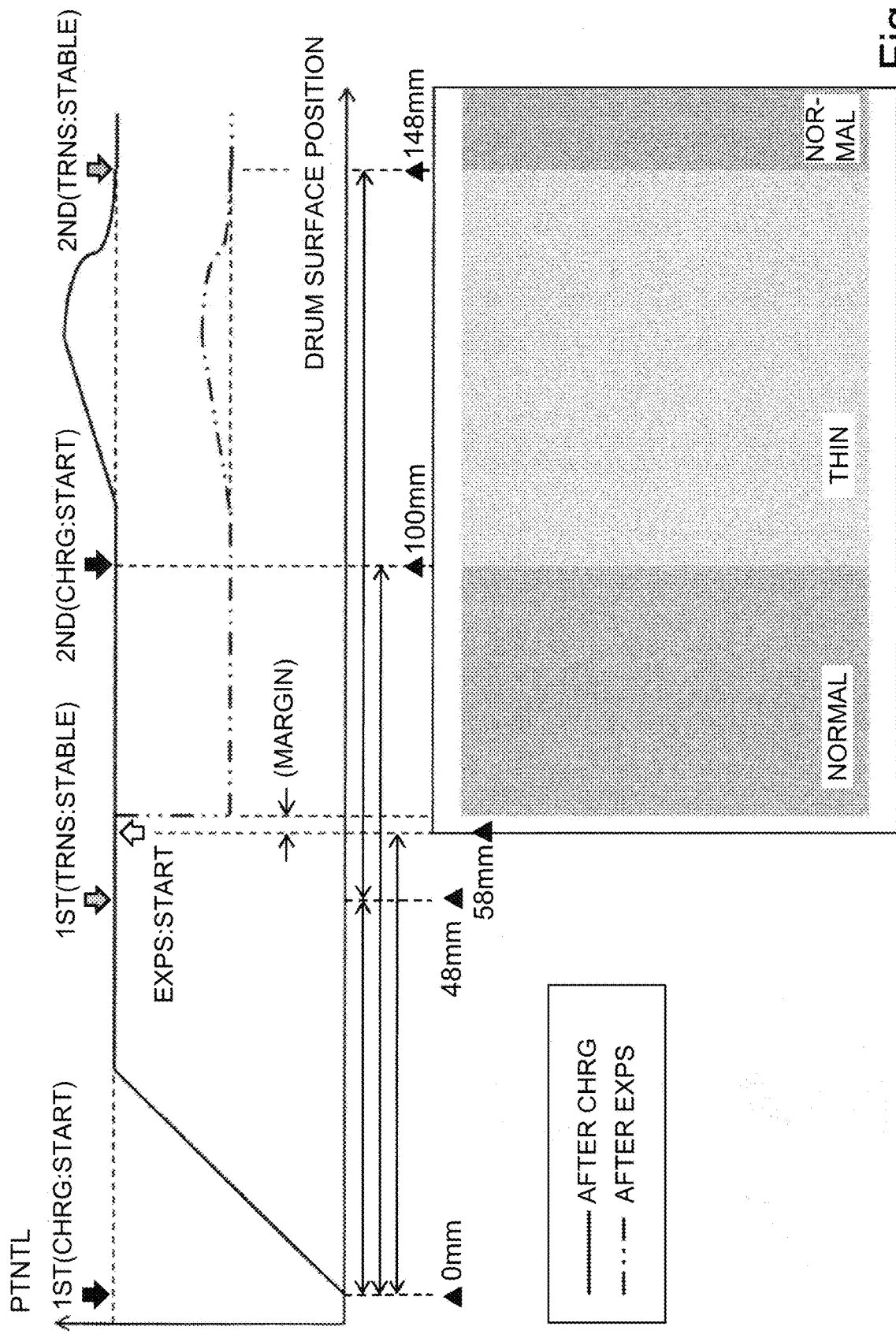

FIG. 8 includes a chart and a schematic view which show a relationship between the surface potential of the photosensitive drum and an image density.

Figure 9:
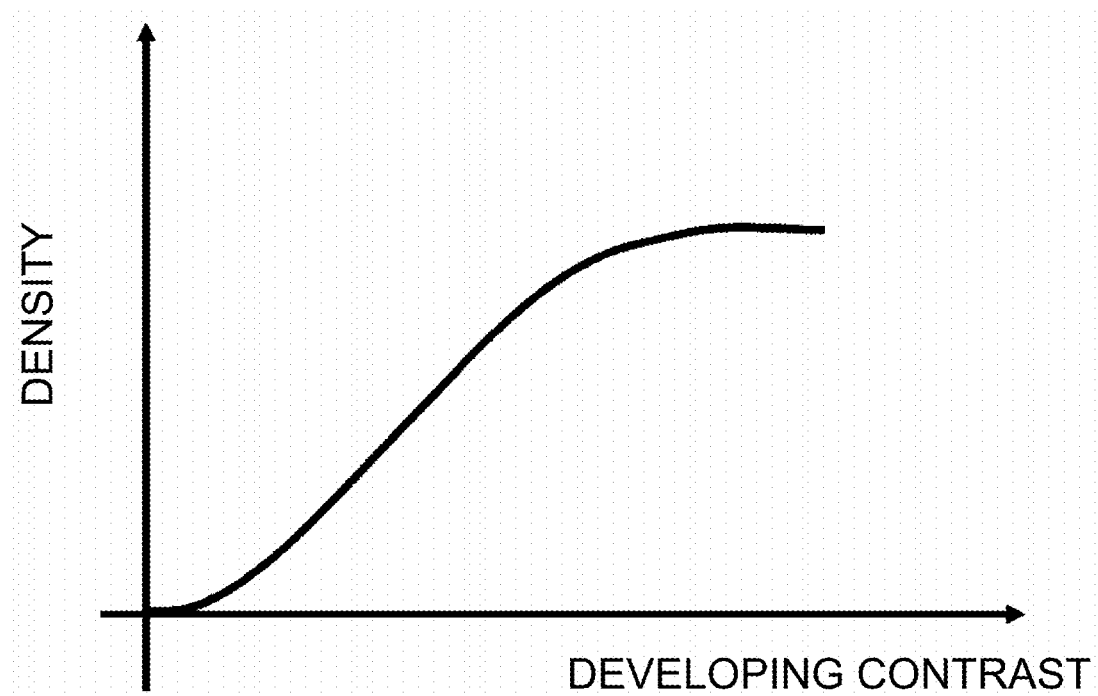

FIG. 9 is a graph showing a relationship between a developing contrast and the image density.

Figure 10:
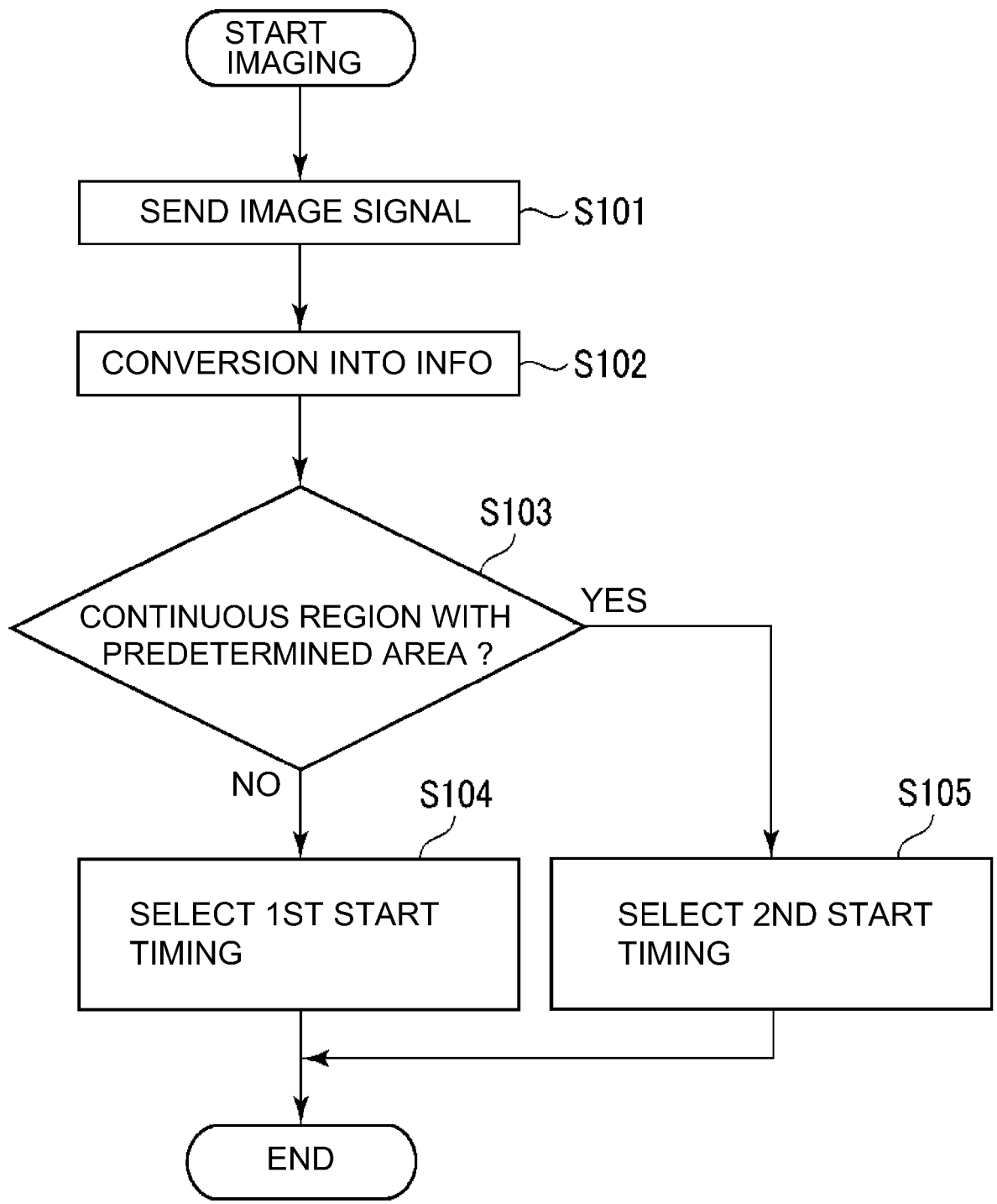

FIG. 10 is a flowchart of control in Embodiment 1.

FIG. 11 is a schematic view showing a result of conversion from a video count voltage into density information on coordinates.

Figure 12:
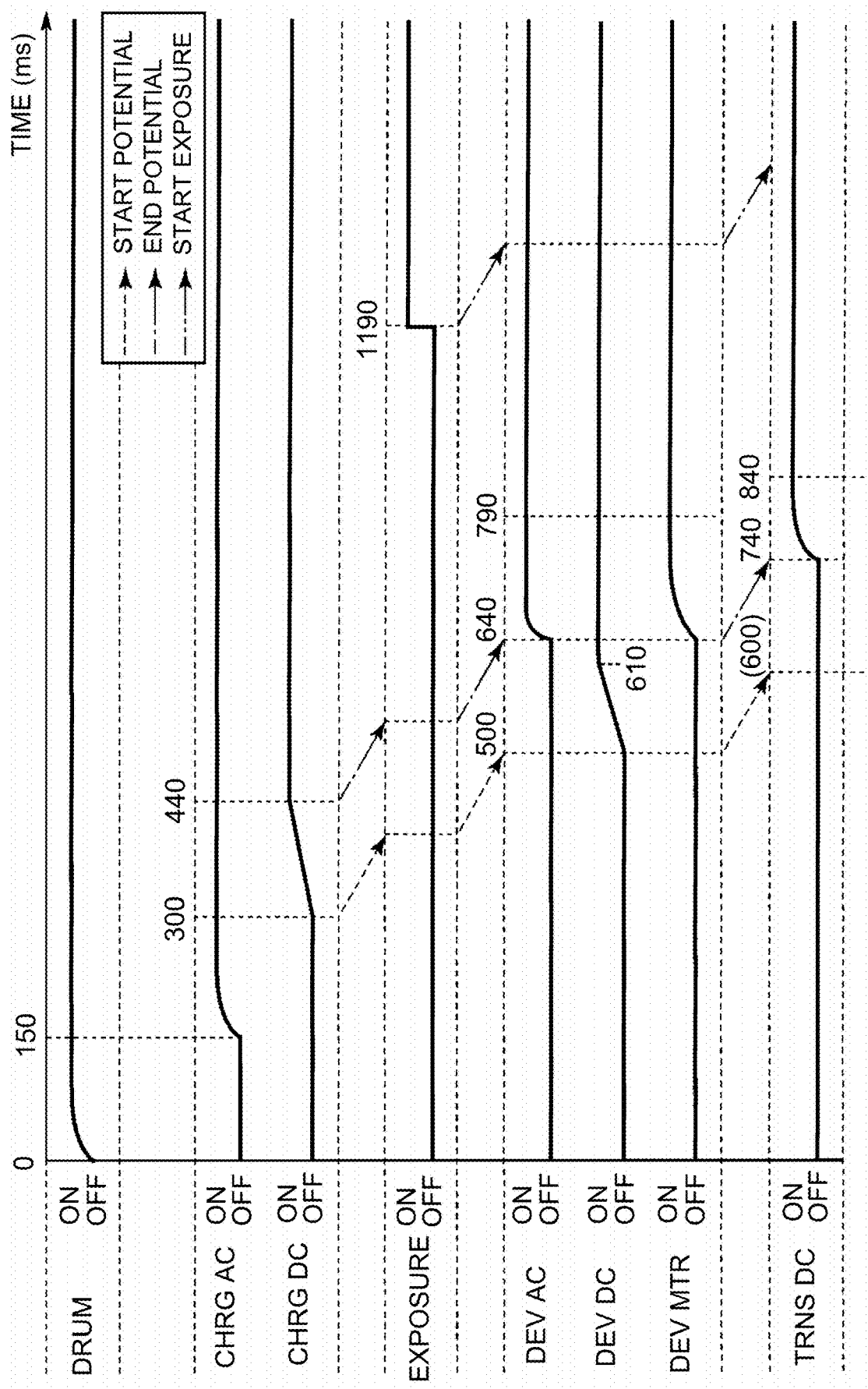

FIG. 12 is a timing chart showing an operation sequence during an image priority mode.

Figure 13:
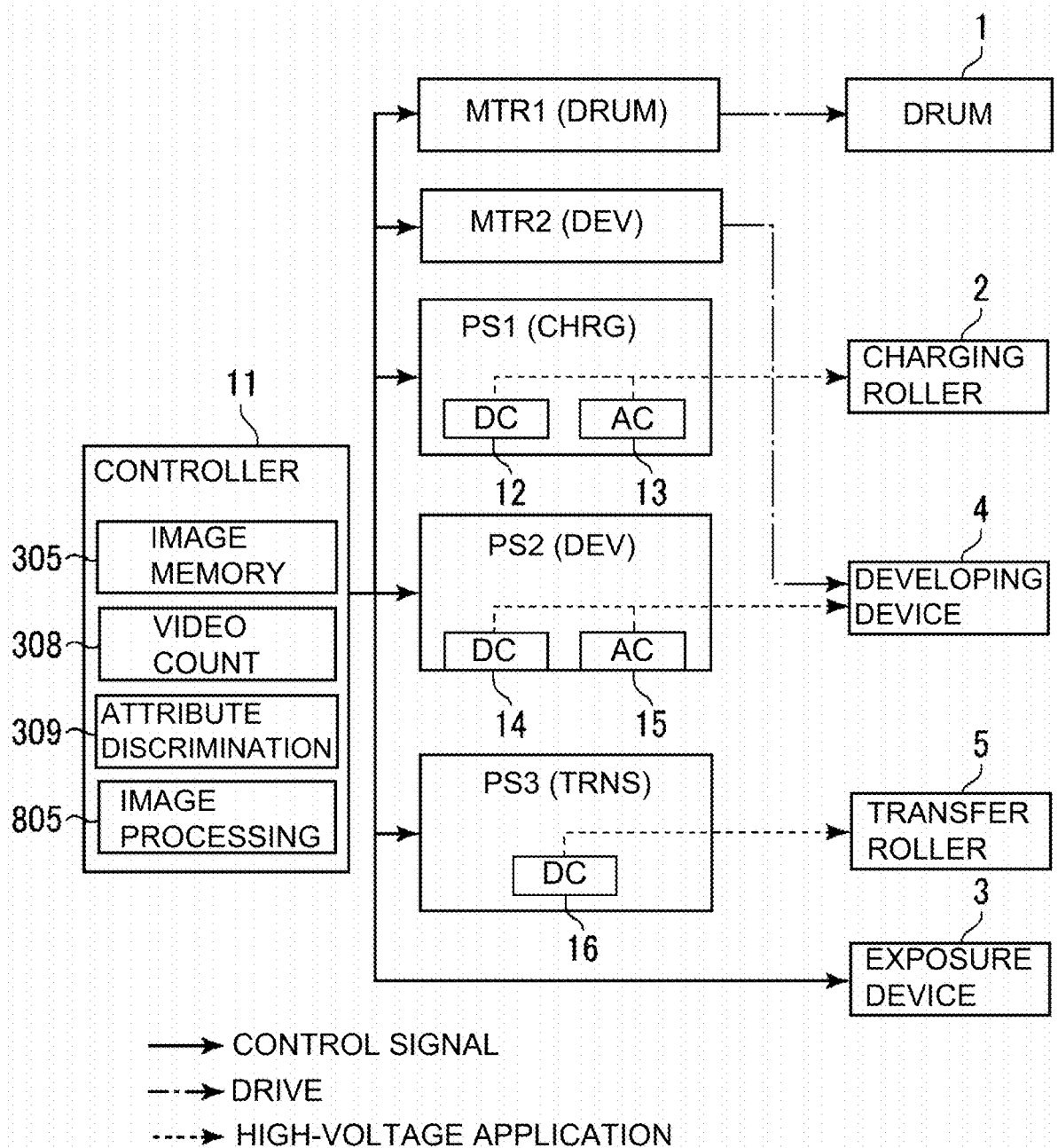

FIG. 13 is a schematic block diagram showing a control mode of a principal part of an image forming apparatus in Embodiment 2.

Figure 14:
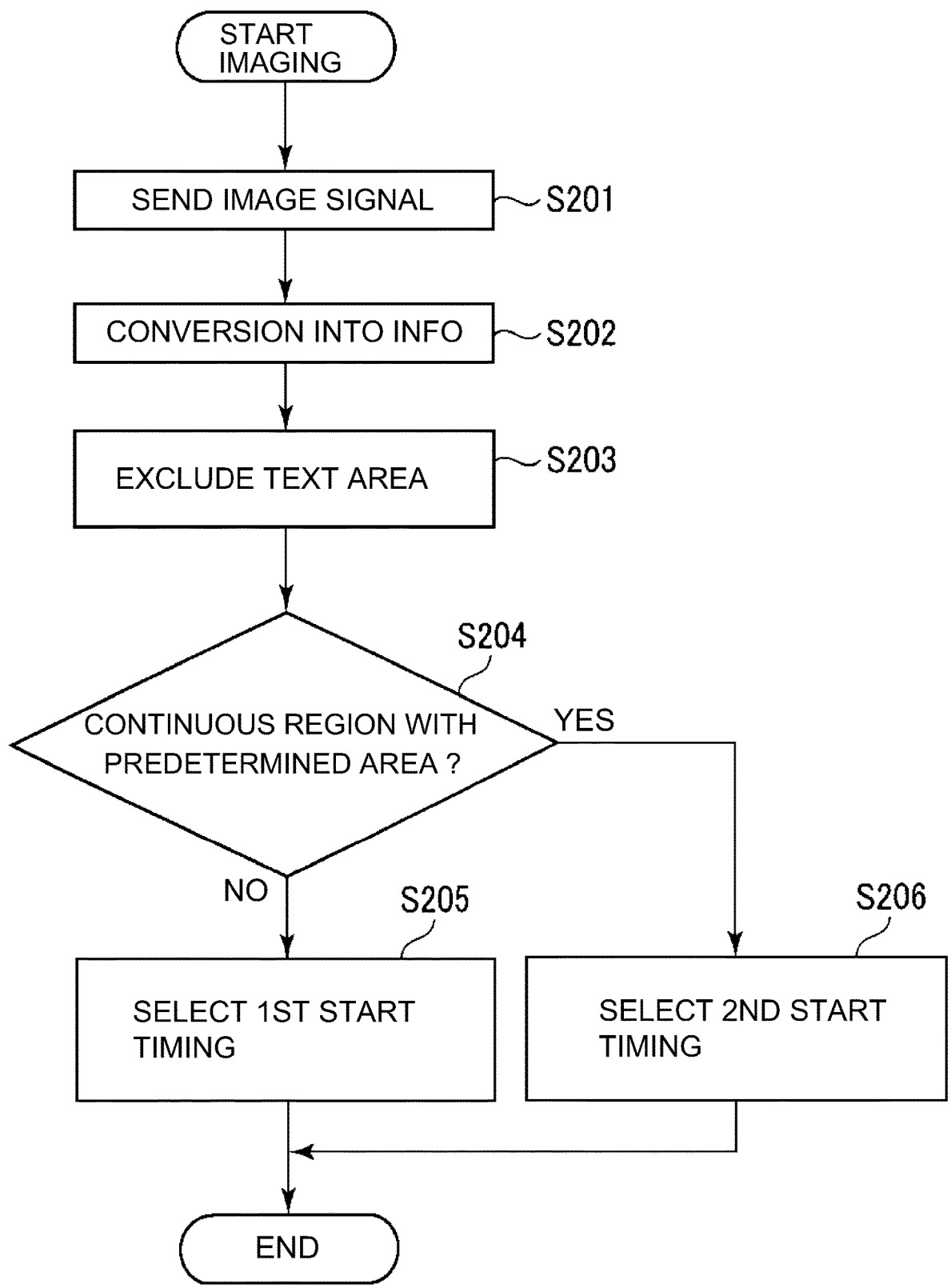

FIG. 14 is a flowchart of control in Embodiment 2.

DESCRIPTION OF THE EMBODIMENTS

An image forming apparatus according to the present invention will be described with reference to the drawings.

Embodiment 1

1. General Constitution and Operation of Image Forming Apparatus

Figure 1:
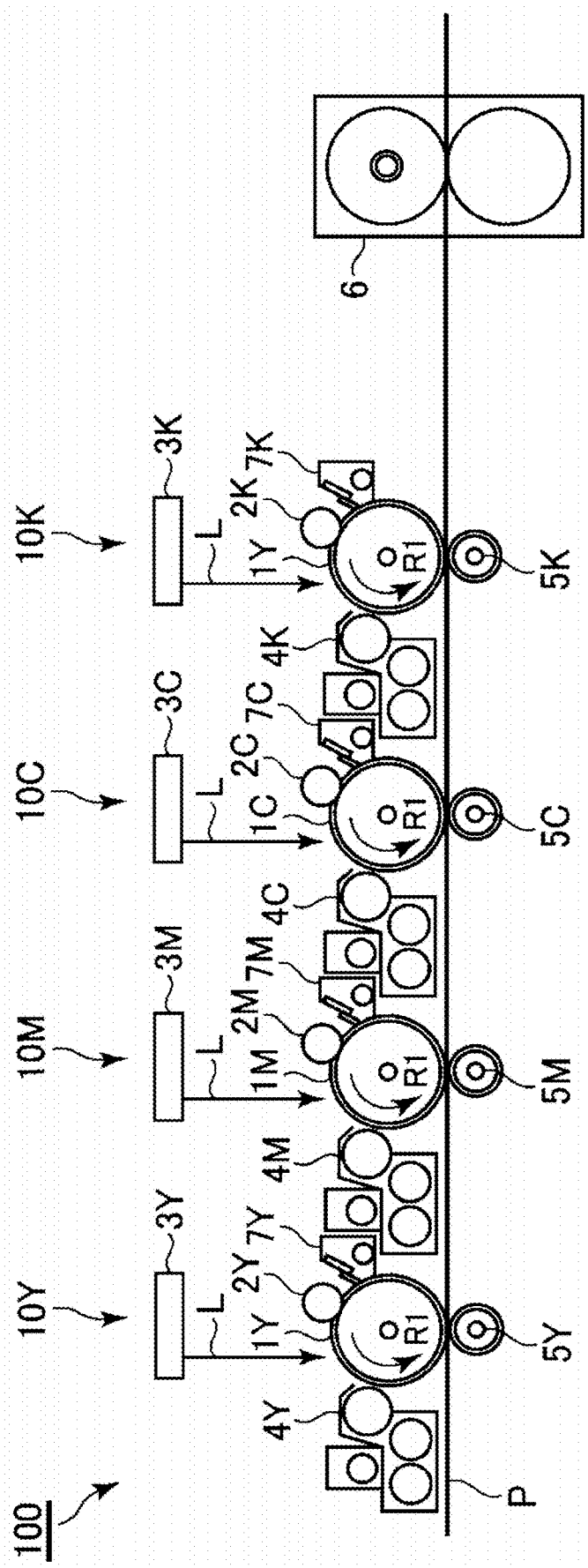
FIG. 1 is a schematic sectional view of an image forming apparatus.

FIG. 1 is a schematic sectional view of an image forming apparatus 100 in this embodiment according to the present invention.

The image forming apparatus 100 in this embodiment is a tandem-type laser beam printer of an electrophotographic type capable of forming a full-color image.

Figure 2:
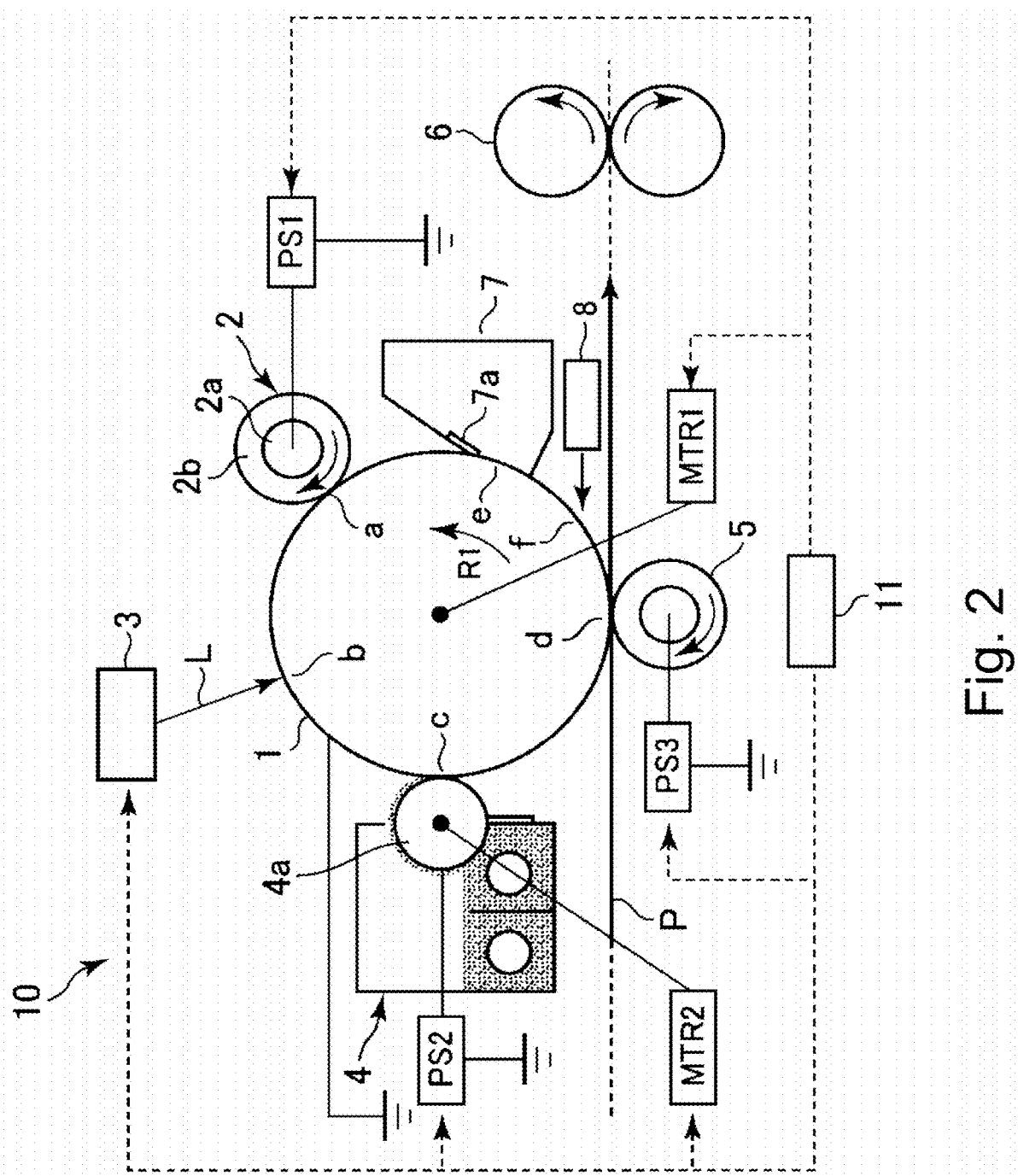
FIG. 2 is a schematic sectional view of an image forming portion.

The image forming apparatus 100 includes first to fourth image forming portions 10Y, 10M, 10C and 10K for forming toner images of yellow (Y), magenta (M), cyan (C) and black (K), respectively. Incidentally, elements having the same or corresponding functions and constitutions in the respective image forming portions 10Y, 10M, 10C and 10K are collectively described by omitting suffixes Y, M, C and K for representing elements for associated colors in some cases. FIG. 2 is a schematic sectional view of the image forming portion 10, in which a control mode is also shown in combination. In this embodiment, the image forming portion 10 is constituted by including a photosensitive drum 1, a charging roller 2, an exposure device 3, a developing device 4, a transfer roller 5, a cleaning device 7, and the like, which are described later.

The image forming apparatus 100 includes the photosensitive drum 1 which is a rotatable drum-shaped (cylindrical) photosensitive member (electrophotographic photosensitive member) as an image bearing member.

In this embodiment, the photosensitive drum 1 is an organic photoconductor (OPC) having a negative chargeability as a charging characteristic. Further, in this embodiment, the photosensitive drum 1 is 100 mm (outer diameter: 31.85 mm) in length with respect to a circumferential direction and is rotationally driven about a center supporting axis at a rotational speed (peripheral speed, process speed) in an arrow R1 direction (counterclockwise direction). Further, in this embodiment, the photosensitive drum 1 is constituted by superposedly coating an undercoat layer, a charge generating layer and a charge transporting layer (thickness: about 20 μm) in a named order on the surface of an aluminum cylinder (electroconductive drum support).

A surface of the rotating photosensitive drum 1 is electrically charged uniformly to a predetermined polarity (negative in this embodiment) and a predetermined potential by a charging roller 2 which is a roller-type charging member (contact charging member) as a charging means. The charging roller 2 contacts the surface of the photosensitive drum 1 and is rotated with rotation of the photosensitive drum 1. The charging roller 2 electrically charges the surface of the photosensitive drum 1 by using a discharge phenomenon occurring in a minute gap formed between itself and the photosensitive drum 1 on each of sides upstream and downstream of the contact portion with respect to a rotational direction of the photosensitive drum 1. In this embodiment, the charging roller 2 is a rubber roller which is prepared by forming a rubber layer 2b as an electroconductive elastic member layer around a core metal (core material) 2a and which is 320 mm in length with respect to a longitudinal direction (rotational axis direction) and 14 mm in diameter. During a charging step, to the charging roller 2, a charging bias (charging voltage) is applied under a predetermined condition by a charging voltage source PS1. The charging voltage source DS1 includes a DC voltage source portion 12 and an AC voltage source portion 13 (FIG. 13). Specifically, to the charging roller 2, an oscillating voltage as the charging bias in the form of a DC voltage (DC component, charging DC bias) superposed with an AC voltage (AC component, charging AC bias) is applied. In this embodiment, to the charging roller 2, an oscillating voltage as the charging roller in the form of the charging DC bias of −700 V superposed with the charging AC bias having a peak-to-peak voltage stably generating electric discharge is applied. As a result, in this embodiment, the surface of the photosensitive drum 1 is electrically charged uniformly to a charge potential (dark(-portion) potential) Vd of −700 V. With respect to the rotational direction of the photosensitive drum 1, a position where a charging process by the charging roller 2 is carried out is a charging position (charging portion) a. As described above, the charging roller 2 charges the surface of the photosensitive drum 1 by the discharge phenomenon occurring in the minute gap between itself and the photosensitive drum 1, but for simplicity, the contact portion between the charging roller 2 and the photosensitive drum 1 may also be regarded and considered as the charging position a.

The charged surface of the photosensitive drum 1 is scanning-exposed to light depending on image information by an exposure device 3 as an exposure means, so that an electrostatic image (electrostatic latent image) is formed on the photosensitive drum 1. In this embodiment, the exposure device 3 is a laser beam scanner using a semiconductor laser. The exposure device 3 outputs laser light L modulated correspondingly to image information sent from a host processing device such as an image reading device (not shown) to a controller 11 described later. Then, the exposure device 3 irradiates the uniformly charged surface of the rotating photosensitive drum 1 with the laser light L. As a result, a potential of the surface of the photosensitive drum 1 at a portion where the photosensitive drum surface is irradiated with the laser light L lowers, so that the electrostatic latent image corresponding to the image information is formed. With respect to the rotational direction of the photosensitive drum 1, a position where the exposure by the exposure device 3 is carried out is an exposure position (exposure portion) b. Incidentally, a distance from the charging position a to the exposure position b along the surface of the photosensitive drum 1 is 20 mm.

Figure 3:
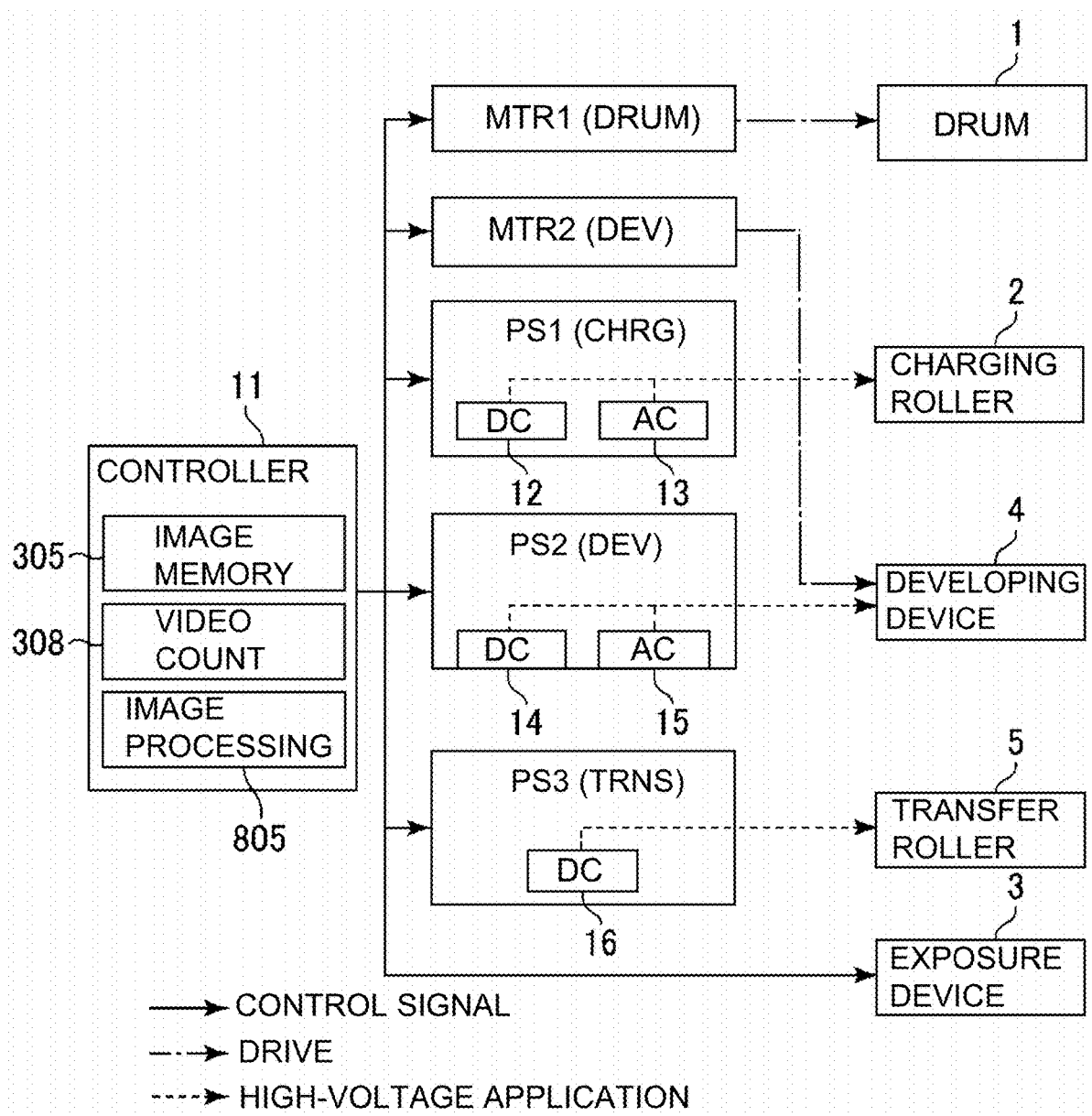
FIG. 3 is a schematic block diagram showing a control mode of a principal part of the image forming apparatus.

The electrostatic image formed on the photosensitive drum 1 is developed (visualized) by being supplied with the toner by the developing device 4 as a developing means, so that the toner image is formed on the photosensitive drum 1. In this embodiment, the toner charged to the same polarity as a charge polarity (negative polarity in this embodiment) of the photosensitive drum 1 is deposited on an image portion, on the photosensitive drum 1, where a potential is lowered by subjecting the surface of the photosensitive drum 1 to the exposure to the laser beam after uniformly charging the surface of the photosensitive drum 1 (reverse development). In this embodiment, the developing device 4 is a developing device employing a two-component contact developing type using a two-component developer, as the developer, containing toner (non-magnetic toner particles) and a carrier (magnetic carrier particles). The developing device 4 includes a developing sleeve 4a, as a developer carrying member feeding the developer to an opposing portion to the photosensitive drum 1 while carrying the developer, which is formed of a non-magnetic material in a hollow cylindrical shape. Inside (at a hollow portion of) the developing sleeve 4a, a magnet roller as a magnetic field generating means is provided. The developing sleeve 4a is rotationally driven so as to move in a direction opposite to the rotational direction of the photosensitive drum 1 at the opposing portion to the photosensitive drum 1. The developing sleeve 4a carries the developer containing the toner charged to a normal charge polarity (negative in this embodiment) and feeds the developer toward the opposing portion to the photosensitive drum 1. Then, the developing sleeve 4a causes a magnetic brush formed by erecting a chain of the developer by the action of the magnet roller to contact the surface of the photosensitive drum 1, so that the toner charged to the normal charge polarity is transferred from the magnetic brush onto the electrostatic latent image on the photosensitive drum 1. During a developing step, to the developing sleeve 4a, a developing bias (developing voltage) is applied under a predetermined condition by a developing voltage source PS2. The developing voltage source DS2 includes a DC voltage source portion 14 and an AC voltage source portion 15 (FIG. 3). Specifically, to the developing sleeve 4a, an oscillating voltage as the developing bias in the form of a DC voltage (DC component, developing DC bias) superposed with an AC voltage (AC component, developing AC bias) is applied. In this embodiment, to the developing sleeve 4a, an oscillating voltage as the developing roller in the form of the developing DC bias of −550 V superposed with the developing AC bias having a peak-to-peak voltage stably depositing the toner on the photosensitive drum 1 is applied. The developing DC bias is set so that a potential difference between itself and the charge potential (−700 V in this embodiment) of the photosensitive drum 1 when the electrostatic latent image reaches the opposing portion to the developing sleeve 4a is a predetermined fog-removing potential difference Vback (150 V in this embodiment). By an electric field by the developing bias, the toner is selectively deposited from the developer carried on the developing sleeve 4a on the electrostatic latent image formed on the photosensitive drum 1. With respect to the rotational direction of the photosensitive drum 1, a position (opposing portion between the developing sleeve 4a and the photosensitive drum 1 in this embodiment) where the toner is supplied from the developing sleeve 4a to the photosensitive drum 1 is a developing position (developing portion) c. Incidentally, a distance from the exposure position b to the developing position c along the surface of the photosensitive drum 1 is 20 mm.

The toner image formed on the photosensitive drum 1 is transferred onto a transfer material P such as a recording sheet as a transfer receiving member by the action of the transfer roller 5 which is a roller-type transfer member as a transfer means. The transfer roller 5 is press-contacted to the photosensitive drum 1 with a predetermined urging force and forms a transfer position (transfer portion, transfer nip) d. The transfer roller 5 is rotated with the rotation of the photosensitive drum 1. The transfer material P is supplied to the transfer position d with predetermined timing by a feeding device (not shown). The transfer material P supplied to the transfer position d is nipped and fed to between the rotating photosensitive drum 1 and the transfer roller 5, so that the toner image is transferred from the photosensitive drum 1 onto the transfer material P during feeding of the transfer material P through the transfer position d. During a transfer step, to the transfer roller 5, a transfer bias (transfer voltage), which is a DC voltage of an opposite polarity (positive in this embodiment) to the normal charge polarity of the toner, is applied by a transfer voltage source PS3. With respect to the rotational direction of the photosensitive drum 1, a position (contact portion between the photosensitive drum 1 and the transfer roller 5 in this embodiment) where the toner image is transferred from the photosensitive drum 1 onto the transfer material P is the transfer position (transfer portion) d. Incidentally, a distance from the developing position c to the transfer position d along the surface of the photosensitive drum 1 is 20 mm. For example, during full-color image formation, the toner images of respective colors of yellow, magenta, cyan and black are successively transferred superposedly onto the transfer material P at the respective transfer positions d.

The transfer material P on which the toner image is transferred is fed to a fixing device 6 as a fixing means. In this embodiment, the fixing device 6 as a fixing means is a heating roller fixing device, and the transfer material P carrying the toner image thereon is subjected to a fixing process of the toner image by being heated and pressed, so that the transfer material P is discharged (outputted) as an image-formed product to an outside of the image forming apparatus 100.

On the other hand, the surface of the photosensitive drum 1 after the transfer step is subjected to a discharging process by a discharging device 8 as a discharging means for removing at least a part of a surface potential of the photosensitive drum 1. In this embodiment, the discharging device 8 includes an LED array. On the surface of the photosensitive drum 1 after passing through the transfer position d, potential hysteresis formed through the respective steps of the charging, the exposure (electrostatic latent image formation), the development (toner image formation) and the transfer remains. The discharging device 8 can remove a residual potential on the surface of the photosensitive drum 1 to substantially 0 V by exposing the surface of the photosensitive drum 1 to light. With respect to the rotational direction of the photosensitive drum 1, a position of the exposure by the discharging device 8 is a discharging position (discharging portion) f.

Further, toner (transfer residual toner) remaining on the surface of the photosensitive drum 1 after the transfer step is removed and collected from the surface of the photosensitive drum 1 by the cleaning device 7 as a cleaning means. In this embodiment, the cleaning device 7 scrapes off the transfer residual toner of the surface of the rotating photosensitive drum 1 with a cleaning blade 7a as a cleaning member contacting the surface of the photosensitive drum 1 and then accommodates the transfer residual toner in a cleaning container. With respect to the rotational direction of the photosensitive drum 1, a position (contact portion between the cleaning blade 7a and the photosensitive drum 1 in this embodiment) where the toner is removed by the cleaning device 7 is a cleaning position (cleaning portion) e.

Incidentally, for simplicity, although herein detailed description will be omitted, the transfer material P may be constituted so as to be successively fed through the contact portions thereof with the respective photosensitive drums 1 while being carried on a transfer belt (constituted) by, for example, an endless belt as a transfer material carrying member. In that case, the transfer roller 5 is urged toward the photosensitive drum 1 through the transfer belt, so that a contact portion between the photosensitive drum 1 and the transfer belt is a transfer position (transfer portion). Further, the image forming apparatus 100 does not have to employ a constitution in which the toner image is directly transferred from the photosensitive drum 1 onto the transfer material P. That is, the image forming apparatus 100 may also employ a constitution in which a toner image is primary-transferred from the photosensitive drum 1 onto an intermediary transfer belt constituted by, for example, an endless belt as an intermediary transfer member and then is secondary-transferred from the intermediary transfer belt onto a transfer material P. In that case, for example, a primary transfer roller as a primary transfer member having the same constitution as the above-described transfer roller 5 is urged toward the photosensitive drum 1 through the intermediary transfer belt, so that a primary transfer position (primary transfer portion) where the photosensitive drum 1 and the intermediary transfer belt are in contact with each other is formed. Further, for example, a secondary transfer roller as a secondary transfer member is provided so as to be urged toward at least one of a plurality of stretching rollers stretching the intermediary transfer belt through the intermediary transfer belt, so that a secondary transfer position (secondary transfer portion) where the intermediary transfer belt and the secondary transfer roller are in contact with each other is formed. Further, a secondary transfer bias of an opposite polarity to the normal charge polarity is applied to the second transfer roller, so that the toner image is secondary-transferred onto the transfer material P nipped and fed by the intermediary transfer belt and the secondary transfer roller.

Further, in this embodiment, an example of a constitution in which the cleaning device 7 is used as the means for removing the transfer residual toner from the surface of the photosensitive drum 1 was cited. However, even when a constitution including a charge optimizing means for the transfer residual toner and employing a cleaner-less type in which the transfer residual toner is collected from the photosensitive drum 1 by the developing device 4 simultaneously with the development is employed, it is possible to apply the present invention thereto. As the charge optimizing means for the transfer residual toner, it is possible to use the charging means or a toner charging member provided separately from the charging means.

Here, in this embodiment, a distance between adjacent image forming portions 10 with respect to a feeding direction of the transfer material P is 100 mm. Incidentally, the distance between the adjacent image forming portions 100 is represented by a distance between adjacent transfer positions d (specifically, between centers of the adjacent transfer positions d with respect to the feeding direction of the transfer material P). At each of the image forming portions 10, the toner image is successively formed with a delay from a preceding color by an inter-color delay time T calculated from the distance between the adjacent image forming portions 10 and the process speed. Incidentally, the inter-color preceding time T is 500 ms calculated from 200 mm/s as the rotational speed of the photosensitive drum 1 and 100 mm as the distance between the adjacent image forming portions 10.

2. Control Mode

Operations of the respective portions of the image forming apparatus 100 are integrally controlled by the controller (control circuit), as a control means, provided in an apparatus main assembly of the image forming apparatus 100. For example, as regards the image forming operation, the controller 11 controls drive of a drum motor MTR1 as a delaying means for the photosensitive drum 1, drive of a developing (device) motor MTR2 as a driving means for the developing device 4, bias application from the voltage sources PS1, PS2 and PS3, and processing of the image information. Further, the controller 11 effects switching of an operation sequence when image formation described later is started.

FIG. 3 is a schematic black diagram showing a control mode of a principal part of the image forming apparatus 100 in this embodiment. The controller 11 sends driving signals to the drum motor MTR1 and the developing motor MTR2. In response to the control signals, the drum motor MTR1 drives the photosensitive drum 1, and the developing motor MTR2 drives the developing sleeve 4a. Further, the controller 11 sends control signals to the charging voltage source PS1, the developing voltage source PS2 and the transfer voltage source PS3. In response to the associated control signal, the charging voltage source PS1 applies voltages from the DC voltage source portion 12 and the AC voltage source portion 13 to the charging roller 2. Further, in response to the associated control signal, the developing voltage source PS2 applies voltages from the DC voltage source portion 14 and the AC voltage source portion 15 to the developing sleeve 4a. Further, in response to the associated control signal, the transfer voltage source PS3 applies a voltage from the DC voltage source portion 16 to the transfer roller 5. Further, the controller 11 sends a control signal corresponding to the image information to the exposure device 3, and in response to the control signal, the exposure device 3 outputs the modulated laser light L. In the controller 11, data of an output image acquired by processing the image information by an image processing portion 805 in the controller 11 is written (stored) in an image memory portion 305 which is a storing means in the controller 11. Then, as regards the output image, a video count value (the number of image signals) described later is counted for each of the colors by a video counting portion 308 as a counting means. The counted video count value is written in the image memory portion 305.

3. Video Count Value

Figure 4:
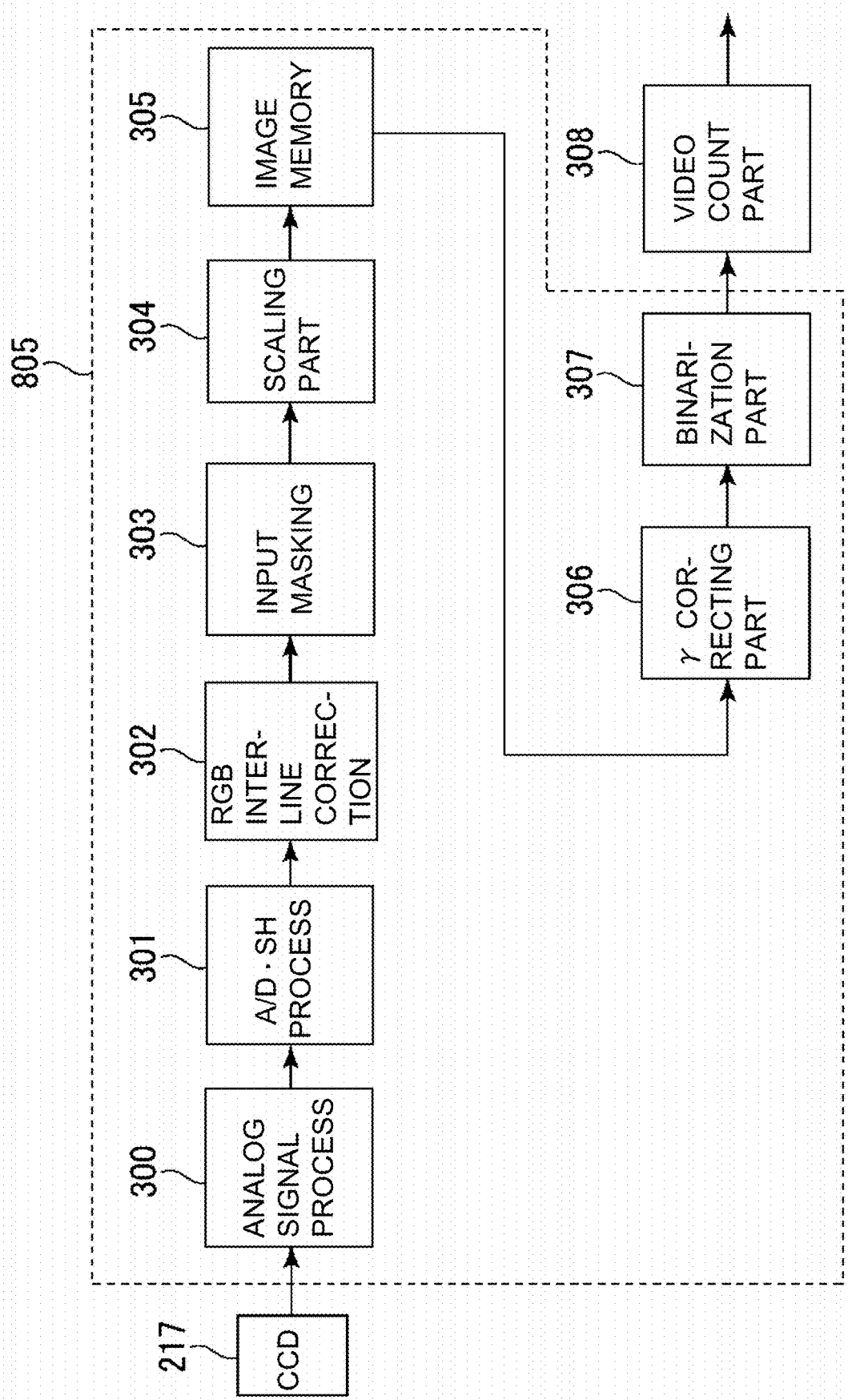
FIG. 4 is a schematic block diagram showing a constitution of an image processing portion.

Next, the video count value will be described. FIG. 4 is a schematic block diagram showing a processing mode of the image information in the controller 11. In this embodiment, the case where the image information is inputted from the image reading device (not shown) to the controller 11 will be described as an example.

An image formed on a CCD sensor 217 of the image reading device is converted into an analog electric signal by the CCD sensor 217. The converted image information is inputted to the image processing portion 805 of the controller 11. The image information inputted to the image processing portion 805 is subjected to sampling and holding and to dark level correction in an analog signal processing portion 300. Thereafter, this signal is subjected to analog/digital conversion (A/D conversion) at an A/D and shading processing portion 301, and then, the digitized signal is subjected to shading correction at the A/D and shading processing portion 301. In the shading correction, correction for a variation in signal of the CCD sensor 217 for each pixel and correction for a variation in light quantity depending on a position based on a light distribution characteristic of an original illumination lamp are made. Thereafter, this signal is subjected to RGB inter-line correction at a RGB inter-line correcting portion 302. Light inputted at a certain time to each of RGB receiving portions of the CCD sensor 217 deviates depending on a positional relationship among the RGB receiving portions on an original, and therefore, synchronization among RGB signals is achieved. Thereafter, at an input masking portion 303, an input masking processing is carried out, so that conversion from brightness data into density data is carried out. The RGB value as it is outputted from the CCD sensor 217 is influenced by a color filter attached to the CCD sensor 217, and therefore, the influence is corrected, so that the RGB value is converted into a pure RGB value. Thereafter, at a scaling portion 304, the image data is subjected to scaling processing with a desired scaling factor, and scaled image data is sent to and accumulated in the image memory portion 305. The image data accumulated in the image memory portion 305 is first sent to a γ-correcting portion 306. At the γ-correcting portion 306, in order to change the image data to output data depending on a set density value, on the basis of a look-up table (LUT) obtained by taking a characteristic of the image forming apparatus 100 into consideration, conversion from original density data into density data corresponding to a desired output density is effected. Then, the converted density data is sent to a binarization portion 307. At the binarization portion 307, conversion of an 8-bit multi-value signal into a binary signal is carried out. For example, as a converting method thereof, dithering, an error diffusion method, an improved error diffusion method, or the like is used. The binarized data is sent to a video counting portion 308, where a counting of the binarized data is carried out for each of the color images.

In this embodiment, a video count value is a value such that in a process of the image information read by the CCD sensor 217, the value is equal to a number of image signals for each of mesh regions in which each of a length with respect to a main scan direction and a length with respect to a sub-scan direction is 500 μm. Incidentally, the main scan direction is a direction substantially parallel to a rotational axis direction of the photosensitive drum 1, and a sub-scan direction is a direction (substantially perpendicular to the main scan direction) substantially parallel to a surface movement direction of the photosensitive drum 1. Further, from this video count value, binarized data of density data acquired at the image processing portion 805 is derived, so that an image density of a toner image formed at each of positions on coordinates with respect to the main scan direction and the sub-scan direction in an image forming region on the photosensitive drum 1 is acquired. Incidentally, in this embodiment, the image forming region on the photosensitive drum 1 is divided into a plurality of mesh regions each having 500 µm in length with respect to the main scan direction and 500 µm in length with respect to the sub-scan direction, and to each of divided regions, information indicating a position on coordinates with respect to the main scan direction and the sub-scan direction is assigned. Then, an image density of a toner image formed at each of positions on associated coordinates is determined. Here, the image forming region refers to a region which is set for each image (for (one) page) to be transferred onto a single transfer material P and in which the toner image is capable of being formed. The exposure device 3 exposes an inside of the image forming region on the charged surface of the photosensitive drum 1, so that the electrostatic latent image is formed in the image forming region.

4. Fastest FCOT Mode

The image forming apparatus 100 in this embodiment is capable of executing the image forming operation in a fastest FCOT mode in which a start of formation of the electrostatic latent image is enabled for shortening the FCOT before movement of the photosensitive drum 1 through one full circumference after rising of the charging bias is completed. In this embodiment, a mode of an operation sequence during image formation is set at a "fastest FCOT mode" in principle, and is automatically switched as described later to an "image priority mode" in the case where a predetermined condition is satisfied.

Figure 5:
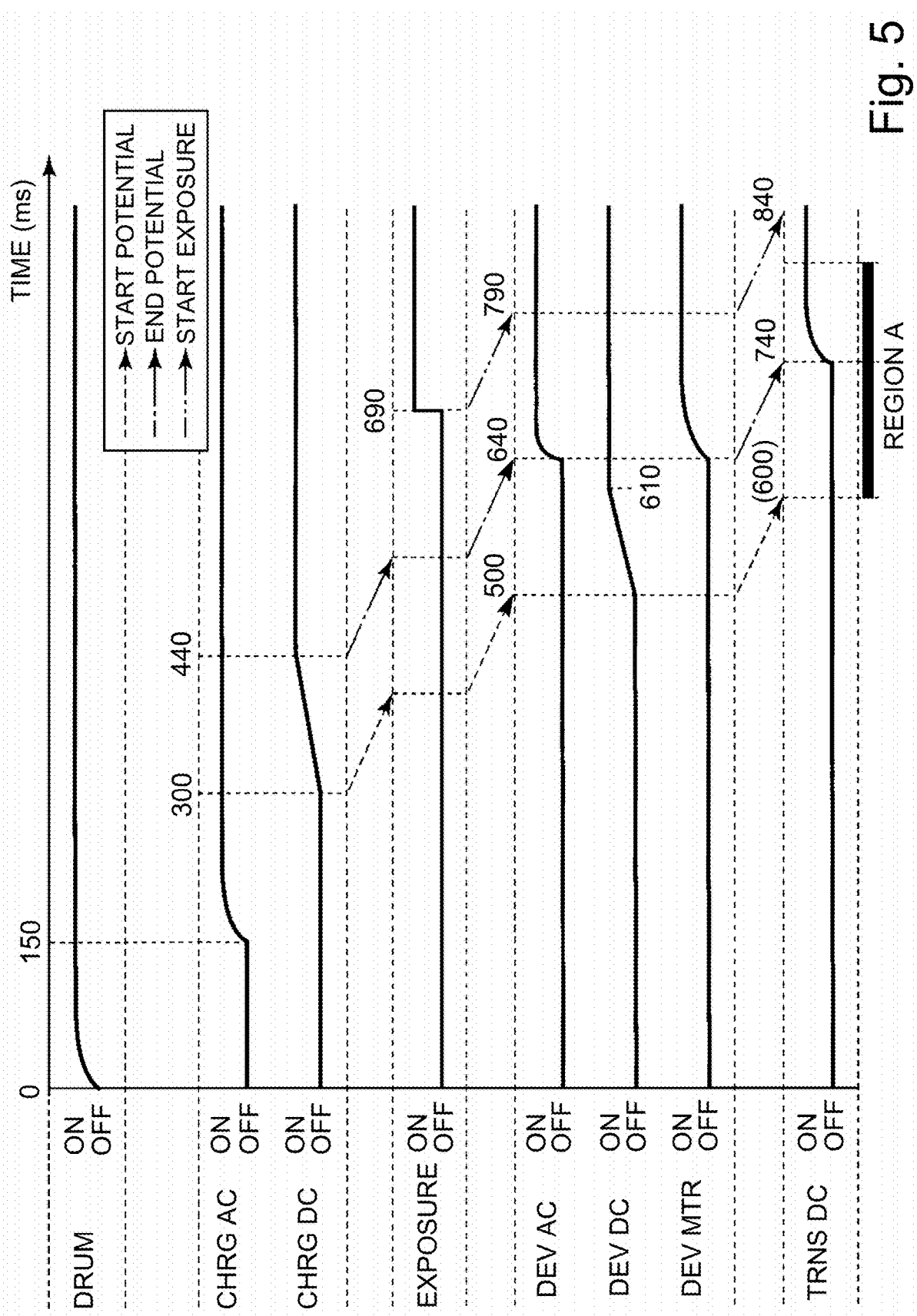
FIG. 5 is a timing chart showing an operation sequence during an FCOT mode.

FIG. 5 is a timing chart showing the operation sequence of each of the image forming portions 10 when the image forming operation is started in the fastest FCOT mode. FIG. 5 shows operations of respective portions in the first image forming portion 10Y. This is also true for the second to fourth image forming portions 10M, 10C and 10K.

When a print signal is turned on, the controller 11 starts the image forming operation. First, the controller 11 causes the drum motor MTR1 to start drive (this time is 0). In this embodiment, a rotational speed of the photosensitive drum 1 is stabilized in a time of about 100 ms. Here, a time until the rotational speed of the photosensitive drum 1 is stabilized varies depending on, for example, a use environment or a use status (such as whether a lifetime period is an initial stage or the last stage), but in this embodiment, the rotational speed of the photosensitive drum 1 is stabilized until 150 ms at the latest (stabilized until a time of 150 ms).

When the rotational speed of the photosensitive drum 1 is stabilized, the controller 11 causes the AC voltage source portion 13 of the charging voltage source PS1 to start application of the charging AC bias, to the charging roller 2, having a peak-to-peak voltage exceeding a discharge start voltage Vth in amplitude (application start from a time of 150 ms). Here, a time until the charging AC bias is stabilized varies depending on, for example, the use environmental or the use status (such as whether the lifetime period is the initial stage or the last stage) of the image forming apparatus 100, but in this embodiment, the charging AC bias is stabilized until 150 ms at the latest (stabilized until a time of 300 ms).

When the charging AC bias is stabilized, the controller 11 causes the DC voltage source portion 13 of the charging voltage source PS1 to start application of the charging DC bias to the charging roller 2 while maintaining the application of the charging AC bias to the charging roller 2 (application start from a time of 300 ms). In this embodiment, the charging DC bias is controlled so as to increase up to a predetermined potential at a certain rate with respect to an elapsed time. Specifically, the charging DC bias fluctuates by −100 V per 20 ms and is controlled so as to increase up to −700 V (in terms of an absolute value). That is, the charging DC bias is increased in potential from the start of application thereof in 140 ms (stabilized until a time of 440 ms). Thus, by applying the charging DC bias, finally, the surface potential of the photosensitive drum 1 immediately after passing through the charging position a increases up to −700 V.

Then, the controller 11 causes the DC voltage source portion 14 of the developing voltage source PS2 to start application of the developing DC bias to the developing sleeve 4a. The application of the developing DC bias is started when the position of the photosensitive drum 1 increased in surface potential at the charging position a reaches the developing position c. That is, the application of the developing DC bias is started with a delay of 200 ms on the basis of the application start time of 300 ms of the charging DC bias (application start from a time of 500 ms). This delay time of 200 ms is calculated from 40 mm which is a distance from the charging position a to the developing position b and 200 mm/s which is the rotational speed of the photosensitive drum 1. In this embodiment, the developing DC bias fluctuates by −100 V per 20 ms similarly as in the case of the charging DC bias and is controlled so as to increase up to −550 V. That is, the developing DC bias is increased in potential from the start of the application thereof in 110 ms (stabilized until a time of 610 ms).

Here, in this embodiment, the charge potential of the photosensitive drum 1 formed by the charging roller 2 during the image formation is −700 V at the charging position a and is also −700 V even at the developing position c (i.e., Vd=−700 V). In this embodiment, a fog-removing potential difference Vback during normal image formation is set at 150 V, so that the developing DC bias corresponding to a potential Vdc of the developing sleeve 4a is set at −550 V. Incidentally, the fog-removing potential difference is a potential difference which is set for the purpose of suppressing unintended toner deposition (toner fog) on the surface of the photosensitive drum 1 and which is a difference between the developing DC bias at the developing position c and the charge potential of the photosensitive drum 1 at the developing position c.

Then, the controller 11 causes the AC voltage source portion 15 of the developing voltage source PS2 to start application of the developing AC bias to the developing sleeve 4a and causes the developing motor MTR to start drive substantially at the same time. The application of the developing AC bias and the drive of the developing motor MTR2 are started when the position of the photosensitive drum 1 where the rising of the surface potential is completed at the charging position a reaches the developing position c. That is, the application of the developing AC bias and the drive of the developing motor MTR2 are started with a delay of 200 ms on the basis of the time of 440 ms when the rising of the charging DC bias (i.e., the surface potential of the photosensitive drum 1) is completed (start of the bias application and the drive from a time of 640 ms). This delay time of 200 ms is calculated from 40 mm which is a distance from the charging position a to the developing position c and 200 mm/s which is the rotational speed of the photosensitive drum 1. Here, a time until the developing AC bias and the drive of the developing motor MTR2 fluctuates depending on, for example, the use environment or the use status (such as whether the lifetime period is the initial stage or the last stage). However, in this embodiment, the developing AC bias and the drive of the developing motor MTR2 are stabilized until 100 ms and 150 ms, respectively, at the latest (stabilized until a time of 740 ms and a time of 790 ms, respectively).

Incidentally, the reason why the application of the developing AC bias and the drive of the developing motor MTR2 are started after the position of the photosensitive drum 1 where the rising of the surface potential of the photosensitive drum 1 is completed at the charging position a reaches the developing position c is as follows. That is, when a proper potential difference Vback is formed by performing rising of both of the charging DC bias and the developing DC bias and then the image forming operation is started, toner fog and carrier deposition onto the photosensitive drum 1 due to the potential difference between the photosensitive drum 1 and the developing sleeve 4a are suppressed.

Then, the controller 11 causes the DC voltage source portion 16 of the transfer voltage source PS3 to start application of the transfer DC bias to the transfer roller 5. The application of the transfer DC bias is started when the position of the photosensitive drum 1 where the rising of the surface potential is completed at the charging position a reaches the transfer position d. That is, the application of the transfer DC bias is started with a delay of 300 ms on the basis of the time of 440 ms when the rising of the charging DC bias (i.e., the surface potential of the photosensitive drum 1) is completed (start of the application from a time of 740 ms). This delay time of 300 ms is calculated from 60 mm which is a distance from the charging position a to the transfer position d and 200 mm/s which is the rotational speed of the photosensitive drum 1. Here, a time until the transfer DC bias fluctuates depending on, for example, the use environment or the use status (such as whether the lifetime period is the initial stage or the last stage), but in this embodiment, the transfer DC bias is stabilized until 100 ms at the latest (stabilized until a time of 840 ms).

Incidentally, the reason why the application of the transfer DC bias is started after the position of the photosensitive drum 1 where the rising of the surface potential of the photosensitive drum 1 is completed at the charging position a reaches the transfer position d is as follows. That is, when the transfer DC bias of the opposite polarity to the charge polarity of the photosensitive drum 1 is applied before the rising of the surface potential of the photosensitive drum 1 is completed, there is a possibility that a memory generates on the surface of the photosensitive drum 1.

As described above, the application of the developing AC bias and the drive of the developing motor MTR2 are started when the position of the photosensitive drum 1 where the rising of the surface potential is completed at the charging position a reaches the developing position c, and the application of the transfer DC bias is started when the position of the photosensitive drum 1 where the rising of the surface potential is completed at the charging position a reaches the transfer position d. Of the application of the developing AC bias, the drive of the developing motor MTR2 and the application of the transfer DC bias, the drive of the developing motor MTR2 takes a longest time until the drive of the developing motor MTR2 is stabilized until 150 ms at the latest (stabilized until the time of 790 ms).

Then, in synchronism with completion of preparation of the image formation by the drive of the motors and the application of the biases as described above, the controller 11 causes the exposure device 3 to start exposure of the surface of the photosensitive drum 1 to light (formation of the electrostatic latent image). In this embodiment, the exposure by the exposure device 3 is started in synchronism with timing when the drive of the developing motor MTR2 is stabilized. Here, with respect to the rotational direction of the photosensitive drum 1, the exposure position b is on a side upstream of the developing position c, and therefore, the exposure start time is earlier than the time when the drive of the developing motor MTR2 is started. That is, on the basis of the time of 790 ms when the drive of the developing motor MTR2 is stabilized, the exposure by the exposure device 3 is started earlier than the drive of the developing motor MTR2 by 100 ms (start of the exposure from a time of 690 ms). This preceding time of 100 ms is calculated from 20 mm which is the distance from the exposure position b to the developing position c and 200 mm/s which is the rotational speed of the photosensitive drum 1.

Incidentally, at each of the second to fourth image forming portions 10M, 10C and 10K, the operations of the respective portions are started with a delay of timing by an inter-color delay time T (500 ms in this embodiment) with respect to the adjacent upstream image forming portion. For example, an application start time of the charging AC bias of the second image forming portion 10M is a time of 650 ms later than the application start time (150 ms) of the first image forming portion 10Y by 500 ms.

Further, values of the respective biases are not limited to those in this embodiment, but may also be those of biases at which pieces of control similar to those described above can be carried out. Further, timings of the drive of the respective motors and the application of the respective biases are not limited to the timings in this embodiment, but may also be timings at which pieces of control similar to those described above can be carried out while ensuring necessary margins in expectation of times until the drive of the motors and the application of the biases are stabilized.

5. Density Difference

Next, the surface potential of the photosensitive drum 1 in the case where the image is formed in the operation sequence in the above-described fastest FCOT mode will be described.

In the operation sequence of FIG. 5, a relationship between the charging DC bias (corresponding to the dark(-)portion) potential of the surface of the photosensitive drum 1) and the transfer DC bias is noted. As is understood from FIG. 5, while the charging DC bias is applied, a portion where the transfer DC bias is not applied or where only the transfer DC bias before being stabilized is applied exists. Specifically, this portion is a region from a start of rising of the surface potential of the photosensitive drum 1 by the increase of the charging DC bias (as indicated by a broken line arrow in FIG. 5) until the transfer DC bias is stabilized. That is, the portion is a region on the photosensitive drum 1 passing through the transfer position d from the time of 600 ms to the time of 840 ms (hereinafter, this region is referred to as a "region A").

Figure 6:
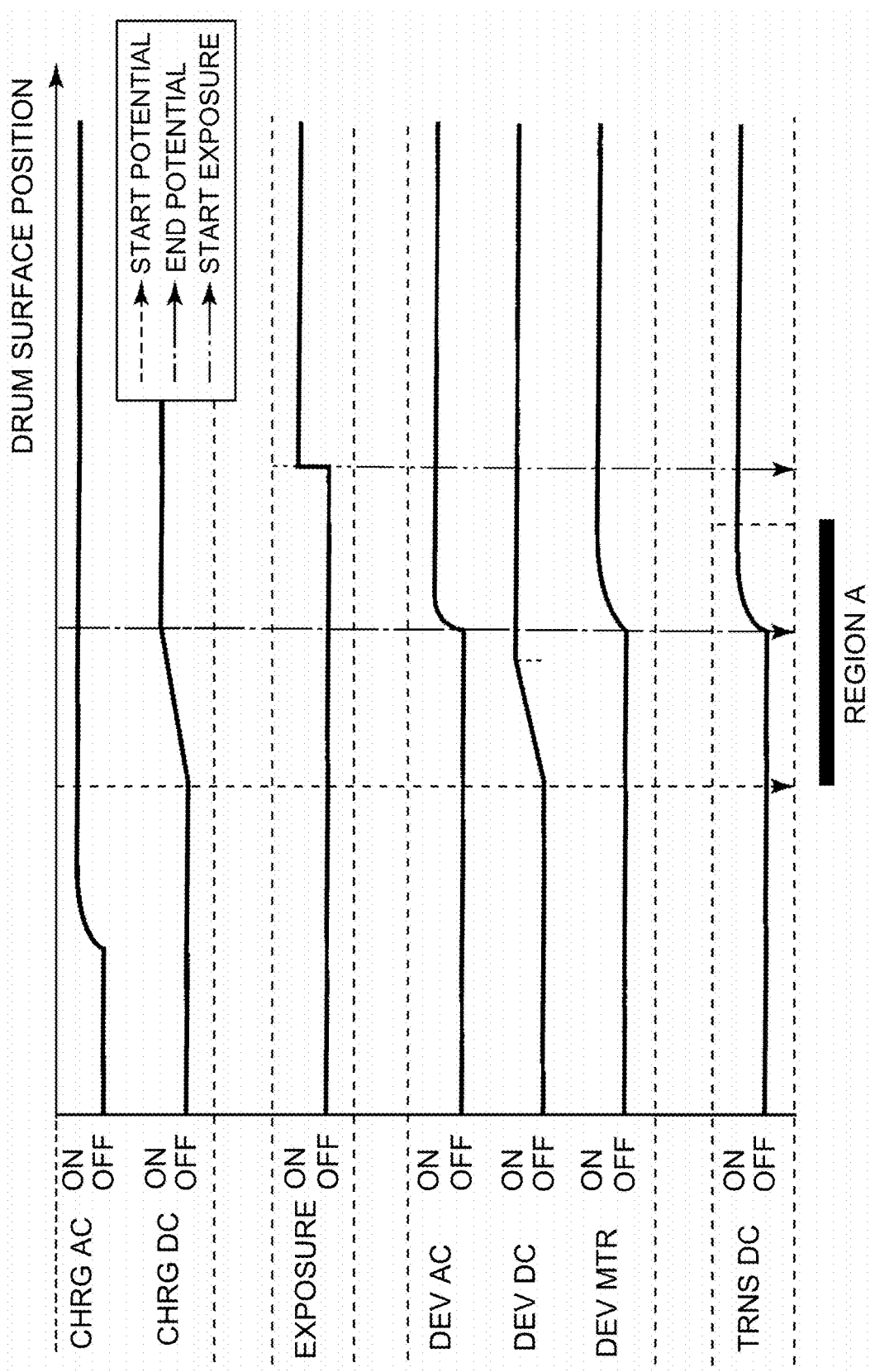
FIG. 6 is a chart in which the timing chart of FIG. 5 is converted on a surface position basis of a photosensitive drum.

FIG. 6 is a chart in which the timing chart of FIG. 5 is converted on a surface position basis of the photosensitive drum 1, in which the region A is replaced with a region A shown in FIG. 6. The region A is 240 ms as a time in which the photosensitive drum surface passes through a certain position (for example, the transfer position d) with respect to the rotational direction of the photosensitive drum 1 and is 48 mm as a width with respect to the rotational direction of the photosensitive drum 1.

Parts (a) to (c) of FIG. 7 are graphs each showing progression of the surface potential of the photosensitive drum 1 formed in the operation sequence of FIG. 5. Referring to FIG. 7, description will be made by comparing the surface potential of the photosensitive drum 1 in the region A with the surface potential of the photosensitive drum 1 at a portion where both of a stable charging DC bias and a stable transfer DC bias are applied during normal image output or the like (hereinafter, this portion is referred to as a "normal portion").

Part (a) of FIG. 7 shows the surface potential of the photosensitive drum 1 in a period from a start of the application of the charging DC bias until one full turn (circumference) of the photosensitive drum 1. A solid line (1) represents the potential (immediately after passing through the charging position a) formed at the charging position a. A broken line (2) represents the potential immediately after a portion of the formed potential passes through the transfer position d. A chain line (3) represents the potential immediately after a potential portion passed through the transfer position d passes through the discharging position f.

The potential of the solid line (1) will be described. The potential increases with an increasing charging DC bias and then becomes constant and stable.

The potential of the broken line (2) will be described. In a region immediately after the portion passes through the charging position a, the transfer DC bias has not yet been applied, and therefore, the potential of the broken line (2) is the same as the potential immediately after the portion passes through the charging position a. Thereafter, in a region in which the potential immediately after the portion passes through the charging position a becomes constant, the transfer DC bias of the opposite polarity to the polarity of the charging DC bias is applied, so that the potential immediately after the portion passes through the transfer position d starts to lower. Then, when the transfer DC bias is stabilized, also the potential immediately after the portion passes through the transfer position d becomes constant and stable.

The potential of the chain line (3) will be described. In a region in which the transfer DC bias is not applied and the potential immediately after the portion passes through the transfer position d is the same as the potential immediately after the portion passes through the charging position a, the potential of the chain line (3) is higher than the potential of the normal portion. The reason therefor is as follows. That is, in this region, the portion where the potential is higher than the potential of the normal portion reaches the discharging position f. However, the discharging device 8 employs a constitution in which a discharging effect in the case where a portion of a residual potential (at the normal portion) on the surface of the photosensitive drum 1 lowered to some extent under application of both of the stable charging DC bias and the stable transfer DC bias reaches the discharging position f is assumed. For that reason, in the case where a portion of a potential higher than the potential of the normal portion reaches the discharging position f, the discharging device 8 cannot sufficiently remove the residual potential on the surface of the photosensitive drum 1. Further, also in a region in which only the transfer DC bias before being stabilized is applied, the potential cannot be sufficiently lowered at the transfer position d, and therefore, the potential immediately after the portion passes through the discharging position f is not sufficiently removed in some cases similarly as in the above-described constitution.

Thus, in the region A in which there is a possibility that the portion of the potential immediately after the portion passes through the transfer position d reaches the discharging position f in a state that the potential is higher than the potential of the normal portion, there is a possibility that the portion reaches the charging position a in movement of the photosensitive drum 1 through subsequent one full circumference while the potential is not sufficiently removed even after the portion passes through the discharging position f Incidentally, as regards the surface position of the photosensitive drum 1, on the basis of the position where the application of the charging DC bias is started, a distance of movement of the photosensitive drum 1 until the transfer DC bias is stabilized is 48 mm, and a distance of movement of the photosensitive drum 1 until the exposure by the exposure device 3 is started is 58 mm. Further, a distance of movement of the photosensitive drum 1 during one full turn (circumference) of the photosensitive drum 1 (i.e., a peripheral (circumferential) length of the photosensitive drum 1 is 100 mm.

Next, part (b) of FIG. 7 shows the surface potential of the photosensitive drum 1 after the portion of the photosensitive drum 1 which rotated through one full turn (circumference) from the start of the application of the charging DC bias reaches the charging position a again. The chain line (3) represents a potential (which is the same as the potential of the chain line (3) of part (a) of FIG. 7) immediately after the portion passes through the discharging position f. The solid line (4) represents a potential (immediately after the portion passes through the charging position a in a second round (turn)) formed at the charging position a in the second round of the photosensitive drum 1 after the portion passed through the discharging position f reaches the charging position a again. The potential of the solid line (4) will be described. In the region A, the residual potential is not removed sufficiently, and therefore, after the portion passes through the charging position a, the potential (leaving hysteresis before the charging) is higher than the potential of the normal portion. That is, a potential difference generates between the region A and each of a region preceding the region A and a region subsequent to the region A.

Further, part (c) of FIG. 7 shows the surface potential of the photosensitive drum 1 formed at the charging position a in the second round of the photosensitive drum 1 and the surface potential of the photosensitive drum 1 formed by exposing the photosensitive drum 1 to light by the exposure device 3. The solid line (4) represents a potential (which is the same as the potential of the solid line (4) of part (b) of FIG. 7) immediately after the portion passes through the charging position a in the second round of the photosensitive drum 1. The chain double-dashed line (5) represents a potential after the photosensitive drum 1 is subjected to uniform exposure to light by the exposure device 3 in order to output an image with a uniform density on the portion having the potential formed in the second round of the photosensitive drum 1. The potential of the chain double-dashed line (5) will be described. In the region A, in the case where the potential immediately after the portion passes through the charging position a is high, even when the photosensitive drum 1 is subjected to uniform exposure to light by the exposure device 3 in order to output the image with the uniform density on the portion having the potential formed in the second round of the photosensitive drum 1, hysteresis of the potential immediately after the portion passes through the charging position a also remains in the potential after the exposure, so that the potential after the exposure becomes high. That is, the potential difference generated between the region A and each of a region preceding the region A and a region subsequent to the region A remains.

FIG. 8 includes a graph and a schematic view which show a relationship between the potential difference and an image density on the photosensitive drum 1 in the case where the image with the uniform density is outputted in the operation sequence of FIG. 5. A solid line in the graph at an upper portion of FIG. 8 represents a potential immediately after the portion passes through the charging position a, and the density difference described above exists behind a position on the photosensitive drum 1 where the exposure by the exposure device 3 is started. At this time, when the uniform exposure by the exposure device 3 is carried out for outputting the uniform density image (particularly a half-tone image as described later), the potential after the exposure is represented by the chain double-dashed line indicated in the graph at the upper portion of FIG. 8. That is, there is a tendency that a portion where the potential is higher than potentials of a preceding portion and a subsequent portion immediately after the portion passes through the charging position a is also higher in potential than the preceding portion and the subsequent portion even after the exposure. When the image is formed by supplying the toner to such an electrostatic latent image, as shown in a lower portion of FIG. 8, an image with a density difference such that the image density is low at the potential difference portion is outputted.

Incidentally, in the rounds of the photosensitive drum 1 after this density difference generates, both of the stable charging DC bias and the stable transfer DC bias are applied, so that an abnormal residual potential such that the residual potential cannot be removed does not generate and therefore the density difference of the output image also does not generate.

As described above, in order to shorten the FCOT, it is required that the formation of the electrostatic latent image is started earlier to the extent possible, but in a rising sequence of the image forming operation, in the case where the formation of the electrostatic latent image is started soon after the respective high voltages and the respective motors are stabilized, there is a possibility that the density difference generates on the output image.

6. Switching of Operation Sequence

Next, switching control of the operation sequence when the image forming operation in this embodiment is started will be described.

The output density difference with a possibility of generation in the operation in the above-described fastest FCOT mode varies in magnitude depending on a density region (density range) of an image formed in a region in which there is a possibility of generation of the density difference. FIG. 9 is a graph showing a density gradient when a developing contrast (potential difference between the density of an image portion on the surface of the photosensitive drum 1 and the potential of the developing sleeve 4a) in this embodiment is changed. As shown in FIG. 9, in the density gradient in the case where the developing contrast is changed, there is a degree of the gradient depending on a range of the developing contrast. For that reason, even when the magnitude of the above-described potential difference is the same, in a density region in which the density of the output image is thin (low) or in a density region in which the density of the output image is close to the density of a solid black image, the density difference of the output image becomes small, so that the density difference is not conspicuous. On the other hand, in the case where the density of the output image is in a density region of the half-tone image, the density difference of the output image becomes large, so that the density difference is readily recognized visually. According to study by the present inventor, the density region in which the density difference is conspicuous is 0.5-1.0 (as measured by a densitometer ("X-Rite 504", manufactured by X-Rite Inc.)). For that reason, in the case where the image in the above-described density region is formed in the region A, and a predetermined range region preceding the region A and a predetermined range region subsequent to the region A (hereinafter, these regions are referred to as a "region B"), the density difference between the region A and the region B is liable to be visually recognized. Particularly, the density difference is easily recognized at a boundary portion between the region A and the region B.

Therefore, in this embodiment, on the basis of a video count value acquired when the image forming operation is started, whether or not an image with a density region of 0.5-1.0 is formed in the region A and the region B is discriminated. Then, depending on a discrimination result, timing of a start of the exposure by the exposure device 3 is selected. Particularly, in this embodiment, the region A is a region from 100 mm to 148 mm behind the position where the application of the charging DC bias is started. Further, in this embodiment, the region B is a region of 10 mm preceding the region A and is a region of 10 mm subsequent to the region A. Further, in this embodiment, whether or not the image with the above-described density region is formed in the region A and the region B (at least one of the region B preceding the region A and the region B subsequent to the region A) is discriminated. Specifically, in this embodiment, whether or not the image which is continuous in a predetermined area or more and which has the above-described density region is formed in the region A and the region B (at least one of the region B preceding the region A and the region B subsequent to the discharge A) is discriminated. Then, in the case where discrimination that the image should be formed is made, the timing of the start of the exposure by the exposure device 3 is delayed so as to avoid the region A. That is, in this case, the mode of the operation sequence when the image formation is started is switched from a "fastest FCOT mode" to an "image priority mode" in which timing of a start of the formation of the electrostatic latent image is made later than the timing in the fastest FCOT mode. This will be described specifically.

FIG. 10 is a schematic flowchart showing a procedure of switching control of the operation sequence when the image forming operation in this embodiment is started.

When the image formation is started, not only a start instruction (print signal) of the image forming operation is inputted to the controller 11 but also image information is sent to the controller 11 (S101). On the basis of the image information, with respect to a first image forming region of a job, the controller 11 carries out conversion from a video count value into density information on respective coordinates with respect to the main scan direction and the sub-scan direction (S102). Incidentally, the job refers to a series of operations in which images are formed and outputted on a single or plurality of transfer materials P depending on a single start instruction. FIG. 11 schematically shows a conversion result into the density information on each of coordinates. Then, on the basis of the density information, the controller 11 discriminates whether or not there is a continuous region with a predetermined area or more in which the image with the density region of 0.5-1.0 is formed in the region A and the region B (at least one of the region B preceding the region A and the region B subsequent to the region A) is discriminated (S103). In this embodiment, the predetermined area (threshold) of the above-described continuous region is 10 mm².

In the case where the controller 11 discriminated that the area of the region is less than the predetermined area in S103, the controller 11 selects, as the timing of the start of the exposure by the exposure device 3, first start timing according to the operation sequence in the fastest FCOT mode shown in FIG. 5 (S104). Incidentally, the selection of the first timing as the timing of the start of the exposure by the exposure device 3 means that the exposure (formation of the electrostatic latent image) can be started from the first timing according to the operation sequence in the fastest FCOT mode shown in FIG. 5. Accordingly, depending on the output image, the exposure (formation of the electrostatic latent image) is not necessarily started actually with timing shown in FIG. 5.

On the other hand, in the case where the controller 11 discriminated that the area of the region is not less than the predetermined area in S103, the controller 11 selects, as the timing of the start of the exposure by the exposure device 3, second start timing made later than the first start timing (S105). FIG. 12 is a timing chart of an operation sequence of each of the image forming portions 10 when the image forming operation is started in the operation in the image priority mode in which the timing of the start of the exposure by the exposure device 3 is the second start timing later than the first start timing. FIG. 12 shows operations of the respective portions in the first image forming portion 10Y. The operations in the second to fourth image forming portions 10M, 10C and 10K are also similar to the operations in the first image forming portion 10Y. As shown in FIG. 12, in the image priority mode, the exposure by the exposure device 3 is started with a delay of 100 mm (500 ms in time) on a position of the photosensitive drum 1 relative to that in the operation sequence in the fastest FCOT mode shown in FIG. 5. That is, with respect to the operation sequence in the target FCOT, the exposure by the exposure device 3 is started after a lapse of a time required for one full turn (circumference) of the photosensitive drum 1. That is, timing of the start of the formation of the electrostatic latent image is delayed so that the formation of the electrostatic latent image is started after a time when the region A first passes through the exposure position b. As a result, it becomes possible to avoid generation of the density difference on the output image. Incidentally, the selection of the second timing as the timing of the start of the exposure by the exposure device 3 means that the exposure (formation of the electrostatic latent image) can be started from the second timing according to the operation sequence in the image priority mode shown in FIG. 12. Accordingly, depending on the output image, the exposure (formation of the electrostatic latent image) is not necessarily started actually with timing shown in FIG. 12. Further, a time (exposure preceding time) in which the timing of the start of the exposure by the exposure device 3 in the operation in the image priority mode is made later than the timing in the operation in the fastest FCOT mode is not limited to the above-described value in this embodiment, but may only be required so that an image defect due to the density difference is suppressed and is capable of being not readily recognized visually.

Thus, the image forming apparatus of this embodiment includes the controller 11 for controlling the start timing which is the timing at which the formation of the electrostatic latent image by the exposure device 3 can be started. The controller 11 carries out switching control of the start timing in the following manner on the basis of information of an image formed in a predetermined region which is a region with a predetermined range on a trailing end side from a position spaced from a leading end of a first image forming region of a job toward the trailing end side by a predetermined distance. That is, this switching control is such that the start timing is switched between first start timing before the portion of the photosensitive drum 1 moves through one full circumference from a time at which the surface potential of the photosensitive drum 1 immediately after the portion passes through the charging position a is stabilized and second start timing later than the first start timing. In this embodiment, the controller 11 carries out the above control on the basis of, as image information, information on an image density. In this embodiment, in the case where the image with the predetermined density range is continuously formed in the above-described predetermined region in a predetermined area or more, the controller 11 switches the start timing to the second start timing. On the other hand, in the case where the image with the predetermined density range is not continuously formed in the predetermined region in the predetermined area or more, the controller 11 switches the start timing to the first start timing. Here, in the first image forming region of the job, the predetermined region is a first region, a predetermined range region closer to a leading end side than the first region is closer to the leading end side is a second region, and a predetermined range region closer to the trailing end side than the first region is closer to the trailing end side is a third region. At this time, the controller 11 carries out the above-described control on the basis of information on an image formed in a plurality of regions containing at least the first region of the first to third regions. Particularly, in this embodiment, in the case where the image with the predetermined density range is continuously formed in the predetermined area or more in each of the plurality of regions containing at least the first region of the first to third regions, the controller 11 switches the start timing to the second start timing. On the other hand, in the case where the image with the predetermined density range is not continuously formed in the predetermined area or more in each of the plurality of regions containing at least the first region of the first to third regions, the controller 11 switches the start timing to the first start timing.

Here, in this embodiment, in the case where the start timing is switched to the first start timing, the predetermined region is a region corresponding to the following region on the photosensitive drum 1. That is, the predetermined region is region corresponding to a region on the photosensitive drum 1 which passes through the charging position a after an absolute value of the surface potential of the photosensitive drum 1 immediately after the portion of the photosensitive drum 1 starts to increase and which passes through the transfer position d before the voltage applied to the transfer roller 5 is stabilized. Further, in this embodiment, the second start timing is the following timing. That is, the second start timing is the timing after a lapse of a time of one full turn (circumference) of the photosensitive drum 1 from first passing, through the exposure position b, of a region of the photosensitive drum 1 which passes through the charging position a after a time at which the surface potential of the photosensitive drum 1 immediately after the portion of the photosensitive drum 1 passes through the charging position a is stabilized and which passes through the transfer position d before a time at which the voltage applied to the transfer roller 5 is stabilized. In other words, the second start timing is the following timing. That is, setting is made so that the second start timing comes after movement of the photosensitive drum 1 through one full circumference from first passing, through the exposure position b, of the region of the photosensitive drum 1 which passes through the transfer position d when the transfer DC voltage applied to the transfer roller 5 reaches a predetermined target transfer voltage. Typically, the second start timing is the timing after movement of the photosensitive drum 1 through one full circumference from the start of the application of the voltage to the transfer roller 5. Further, in this embodiment, the application of the voltage to the transfer roller 5 is started when the region of the photosensitive drum 1 in which the surface potential of the photosensitive drum 1 immediately after the portion of the photosensitive drum 1 passes through the charging position a is stabilized. Further, in this embodiment, on the basis of a counting result of the number of image signals for each of regions obtained by dividing the image forming region, the controller 11 acquires information on a density of an image formed in each of the regions.

Further, in other words, the image forming apparatus 100 of this embodiment is operable in a first mode (fastest FCOT mode) and a second mode (image priority mode) which are different in start timing, which is timing when formation of the electrostatic latent image can be started. The first mode is such that the start timing is the first start timing before movement of the photosensitive drum 1 through one full circumference from a time at which the surface potential of the photosensitive drum 1 immediately after the portion of the photosensitive drum 1 passes through the charging position a is stabilized. Further, the second mode is such that the start timing is the second start timing later than the first start timing. Further, in the operation in the second mode, with a start of the image formation, the application of the transfer DC voltage to the transfer roller 5 is started. Then, setting is made so that the second start timing comes after movement of the photosensitive drum 1 through one full circumference from first passing, through the exposure position b, of the region of the photosensitive drum 1 which passes through the transfer position d when the transfer DC voltage applied to the transfer roller 5 reaches a predetermined target transfer voltage. Further, the second start timing may also be set in the following manner. Further, in the operation in the second mode, with a start of the image formation, the application of the charging DC voltage to the charging roller 5 is started. Then, setting may also be made so that the second start timing comes after movement of the photosensitive drum 1 through one full circumference from first passing, through the exposure position b, of the region of the photosensitive drum 1 which passes through the charging position a when the charging DC voltage applied to the charging roller 2 reaches a predetermined target charging voltage.

The image forming apparatus 100 operates in the first mode in the case where an image satisfying a predetermined condition is not formed in a predetermined region which is a region in a predetermined range on a trailing end side from a position spaced by a predetermined distance toward the trailing end side from a leading end of the first image forming region of a job with respect to the transfer material feeding direction. On the other hand, the image forming apparatus 100 operates in the second mode in the case where the image satisfying the predetermined condition is formed in the predetermined region. Particularly, in this embodiment, the predetermined condition is such that an image with a predetermined density range is continuous in a predetermined area or more.

As described above, in this embodiment, whether or not there is a possibility of generation of the density difference on the output image is predicted, and in the case where no (or a sufficiently small) possibility of the generation of the density difference is predicted, the operation sequence in the fastest FCOT mode is maintained. On the other hand, in the case where the possibility of the generation of the density difference is predicted, the operation sequence is changed to an operation sequence in the image priority mode in which the timing of the start of the exposure by the exposure device 3 is made later than the timing in the operation sequence in the fastest FCOT mode, so that the generation of the density difference on the output image is suppressed. That is, in this embodiment, the density information is acquired from a video count value, and depending on the case where there is no possibility of generation of the density difference and the case where there is a possibility of generation of the density difference, the fastest FCOT mode and the image priority mode are selected, respectively. Thus, the operation sequence is changed only in a necessary case, whereby a delay of an image output time more than necessary is suppressed while suppressing the generation of the image defect due to the density difference, so that it becomes possible to suppress a lowering in productivity of the image.

Incidentally, in this embodiment, the start timing was changed on the basis of whether or not the image with the predetermined density range is continuously formed in the predetermined area or more. As another method, the start transfer material may also be changed on the basis of only whether or not the image with the predetermined density range is formed. In this case, the start transfer material may only be required to be delayed in the case where the image with the predetermined density range is formed. Further, in this embodiment, the start timing was changed on the basis of whether or not the predetermined image is formed in the region A and at least one of the region B preceding the region A and the region B subsequent to the region A. As another method, the start timing may also be changed on the basis of whether or not the predetermined image is formed in the region A and both of the region B preceding the region A and the region B subsequent to the region A. Further, as another method, the start timing may also be changed on the basis of whether or not the predetermined image is formed over the region A and at least one (or both of) the region B preceding the region A and the region B subsequent to the region A.

Embodiment 2

Next, another embodiment of the present invention will be described. Basic constitutions and operations of an image forming apparatus in this embodiment are the same as those of the image forming apparatus in Embodiment 1. Accordingly, in the image forming apparatus in this embodiment, elements having the same or corresponding functions and constitutions as those in the image forming apparatus in Embodiment 1 are represented by the same reference numerals or symbols as those in Embodiment 1 and will be omitted from detailed description.

FIG. 13 is a schematic block diagram showing a control mode of a principal part of an image forming apparatus 100 of this embodiment. In this embodiment, a controller 11 includes an image attribute discriminating portion 309. The image attribute discriminating portion 309 discriminates an image attribute, at each pixel, of image information inputted to the controller 11. Specifically, the image attribute discriminating portion 309 discriminates a kind of attributes (such as a text attribute, a graphics attribute and a photographic attribute) of each of pixels on the basis of image attribute information contained in image information at each pixel and then acquires the kind of attribute.

That is, as regards the density difference of the output image for which there is a possibility of generation in the operation in the fastest FCOT mode described in FIG. 1, there is a difference in degree of ease of viewability depending on the attribute of the image formed in a region in which there is a possibility of generation of the density difference. For example, the text attribute (character) is less conspicuous than the graphics attribute (picture) and the photographic attribute (photograph). For that reason, even in the case where in the fastest FCOT mode, the image is formed in the region in which there is a possibility of generation of the density difference, when an amount of a region in which the image has the text attribute is large, the density difference is not readily recognized visually even in output of the image in the fastest FCOT mode.

Therefore, in this embodiment, the image having the text attribute is excluded from the image formed on the photosensitive drum 1 in the region A and the region G, and then the image after the exclusion is subjected to discrimination similar to the discrimination in Embodiment 1, so that selection of the fastest FCOT mode or the image priority mode is performed.

FIG. 14 is a schematic flowchart showing a procedure of switching control of the operation sequence when the image forming operation in this embodiment in started. Processes of S201, S202 and S204 to S206 in FIG. 14 are similar to processes of S101, S102 and S103 to S105 in FIG. 10, respectively, and therefore, will be omitted from detailed description.

In this embodiment, in S203, the controller 11 excludes density information (area), in which the image attribute is the text attribute, from density information converted from a video count value on each coordinate (section). Then, in this embodiment, in S204, on the basis of the density information after the exclusion of the density information (area) of the image having the text attribute therefrom, the controller 11 discriminates whether or not there is a continuous region with a predetermined area or more in which the image with the density region of 0.5-1.0 is formed in the region A and the region B (at least one of the region B preceding the region A and the region B subsequent to the region A) is discriminated. In this embodiment, similarly as in Embodiment 1, the predetermined area (threshold) of the above-described continuous region is 10 mm$^2$.

Thus, in this embodiment, on the basis of the information on the image density and the information on the image attribute which are used as the image information, the controller 11 carries out control in which the start timing which is timing at which the formation of the electrostatic latent image by the exposure device 3 is capable of being started is switched. In this embodiment, in the case where the image having the predetermined density range and the predetermined attribute is continuously formed in the predetermined region of the first image forming region of the job in a predetermined area or more, the controller 11 switches the start timing to the second start timing. On the other hand, in the case where the image having the predetermined density range and the predetermined attribute is not continuously formed in the predetermined region in the predetermined area or more, the controller 11 switches the start timing to the first start timing. Here, in the first image forming region of the job, the predetermined region is a first region, a predetermined range region closer to a leading end side than the first region is closer to the leading end side is a second region, and a predetermined range region closer to the trailing end side than the first region is closer to the trailing end side is a third region. At this time, the controller 11 carries out the above-described control on the basis of information on an image formed in a plurality of regions containing at least the first region of the first to third regions. Particularly, in this embodiment, in the case where the image having the predetermined density range and the predetermined attribute is continuously formed in the predetermined area or more in each of the plurality of regions containing at least the first region of the first to third regions, the controller 11 switches the start timing to the second start timing. On the other hand, in the case where the image having the predetermined density range and the predetermined attribute is not continuously formed in the predetermined area or more in each of the plurality of regions containing at least the first region of the first to third regions, the controller 11 switches the start timing to the first start timing. In other words, the image forming apparatus 100 operates in the first mode (fastest FCOT mode in the case where the image having the predetermined density range and the predetermined attribute is continuously formed in the predetermined area or more in each of the plurality of regions including at least a first region of first, second and third regions, and operates in the second mode (image priority mode) in the case where the image is not continuously formed.

As described above, in this embodiment, by adding control in which the attribute of the image formed in the region in which there is a possibility of generation of the density difference, the delay of the image output time more than necessary can be further suppressed in this embodiment than in Embodiment 1.

Incidentally, in this embodiment, the start timing was changed on the basis of whether or not the image having the predetermined density range and the predetermined attribute (attribute other than the text attribute in this embodiment) is continuously formed in the predetermined area or more. As another method, the start transfer material may also be changed on the basis of only whether or not the image having the predetermined attribute is formed. In this case, the start transfer material may only be required to be delayed in the case where the image having the predetermined attribute is formed. Further, similarly as described in Embodiment 1, the start timing may also be changed on the basis of whether or not the predetermined image is formed in the region A and both of the region B preceding the region A and the region B subsequent to the region A. Further, similarly as described in Embodiment 1, the start timing may also be changed on the basis of whether or not the predetermined image is formed over the region A and at least one (or both of) the region B preceding the region A and the region B subsequent to the region A.

Other Embodiments

The present invention was described based on the specific embodiments mentioned above, but is not limited to the above-mentioned embodiments.

The start timing which is the timing at which the formation of the electrostatic latent image is capable of being started is not limited to the timings in the above-described embodiments. For example, the start timing may also be changed depending on application start timings of the charging bias and other biases, the use environment of the image forming apparatus, the use status (whether the lifetime period is the initial stage or the last stage or the like), the density of the image to be outputted, the kind of the transfer material, and the like. In accordance with the present invention, the start timing may only be required to be constituted so as to be switched, depending on the image information, between the above-described first timing and the above-described second timing later than the first timing.

Further, in the above-described embodiments, switching of the operation sequence is automatically performed, but depending on the density difference of the image to be outputted or the like, the operation sequence may also be capable of being manually changed by an operator such as a user of the image forming apparatus or a service person for performing maintenance and inspection. Such a change in operation sequence can be made by inputting an instruction from an operating portion provided on the image forming apparatus or an external device such as a host computer communicatably connected with the image forming apparatus.

According to the present invention, it is possible to improve the productivity of the image formation while suppressing the generation of the density difference on the output image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-225985 filed on Nov. 24, 2017, which is hereby incorporated by reference herein in its entirety.

What is claimed is:

1. An image forming apparatus comprising:
a rotatable photosensitive member;
a charging device configured to electrically charge said photosensitive member at a charging position under application of a voltage;
an exposure device configured to expose said photosensitive member, charged by said charging device, to light at an exposure position thereby to form an electrostatic image on said photosensitive member;
a developing device configured to develop the electrostatic latent image into a toner image by supplying toner to a region of said photosensitive member exposed by said exposure device;
a transfer device configured to transfer the toner image from said photosensitive member onto a toner image receiving member at a transfer position under application of a voltage; and
a controller capable of executing:
an operation in a first mode in which an image forming operation is controlled so that an exposure start enable timing of said exposure device for a first sheet in an image forming job is set during movement of said photosensitive member through one full circumference from first passing, through the exposure position, of a region of said photosensitive member which has passed through the charging position when a DC voltage applied to said charging device with a start of image formation reaches a predetermined target voltage, and
an operation in a second mode in which an image forming operation is controlled so that the exposure start enable timing is set after movement of said photosensitive member through one full circumference after first passing, through the exposure position, of the region of said photosensitive member which has passed through the charging position when the DC voltage applied to said charging device with the start of image formation reaches the predetermined target voltage,
wherein on the basis of image information of the first sheet of the image forming job, said controller selects an executing mode from a plurality of modes including at least the first mode and the second mode.

2. An image forming apparatus according to claim 1, wherein in the operation in the second mode, said controller executes the image forming operation so that the exposure start enable timing is set after movement of said photosensitive member through one full circumference after first passing, through the exposure position, of the region of said photosensitive member which has passed through the transfer position when a DC voltage applied to said transfer device with the start of image formation reaches a predetermined target voltage.

3. An image forming apparatus according to claim 1, wherein said controller executes the operation in the first mode when an image satisfying a predetermined condition is not formed in a predetermined region of the first sheet in the image forming job, and executes the operation in the second mode when the image satisfying the predetermined condition is formed in the predetermined region.

4. An image forming apparatus according to claim 1, wherein the image information is information on a density of an image.

5. An image forming apparatus according to claim 4, wherein when a predetermined region of the first sheet in the image forming job is divided into a plurality of regions, said controller specifies the region in which the density of the image is in a predetermined density range, and
wherein said controller executes the operation in the second mode when the specified region is continuously formed in a predetermined area or more, and executes the operation in the first mode when the specified region is not continuously formed in the predetermined area or more.

6. An image forming apparatus according to claim 1, wherein the image information is information on an attribute of an image.

7. An image forming apparatus according to claim 6, wherein said controller executes the operation in the second mode when the attribute of the image formed in a predetermined region of the first sheet in the image forming job is a predetermined attribute, and executes the operation in the first mode when the attribute of the image formed in the predetermined region is not the predetermined attribute.

8. An image forming apparatus according to claim 1, wherein when timing when the region of the photosensitive member which has passed through the exposure position at the exposure start enabled timing first passes through the transfer position is first timing and when timing when a DC voltage applied to said transfer device with the start of image formation reaches a predetermined target voltage is second timing, said controller controls the exposure start enabled timing so that the first timing is later than the second timing.

9. An image forming apparatus according to claim 1, wherein said controller controls timing of application of a DC voltage to said transfer device so that the application of the DC voltage to said transfer device is started after the region of said photosensitive member which has passed through the charging position when the DC voltage applied to said charging device with the start of image formation reaches the predetermined target voltage first passes through the transfer position.

10. An image forming apparatus according to claim 1, wherein said controller executes the operation in the first mode when an image with a maximum density is formed in an entire area of the first sheet in the image forming job, and executes the operation in the second mode when an image with a halftone density in a predetermined range is formed in the entire area of the first sheet in the image forming job.

11. An image forming apparatus according to claim 1, wherein in the operation in the second mode, said controller controls the image forming operation so that the exposure start enabled timing is set before said photosensitive member moves two full circumferences from when the region of said photosensitive member which has passed through the charging position when the DC voltage applied to said charging device with the start of image formation reaches the predetermined target voltage first passes through the exposure position.

* * * * *